US005532544A

United States Patent [19]

Yoshioka et al.

[11] Patent Number: 5,532,544

[45] Date of Patent: Jul. 2, 1996

[54] ELECTRON-EMITTING DEVICE WITH ELECTRON-EMITTING REGION INSULATED FROM ELECTRODES

[75] Inventors: Seishiro Yoshioka, Hiratsuka; Ichiro Nomura, Yamato; Hidetoshi Suzuki, Atsugi; Toshihiko Takeda, Tokyo; Tetsuya Kaneko, Yokohama; Yoshikazu Banno, Atsugi; Kojiro Yokono, Yokohama, all of Japan

[73] Assignee: Ganon Kabushiki Kaisha, Tokyo, Japan

[21] Appl. No.: 366,430

[22] Filed: Dec. 30, 1994

Related U.S. Application Data

[63] Continuation of Ser. No. 58,801, May 10, 1993, abandoned, which is a continuation of Ser. No. 694,014, Apr. 30, 1991, abandoned, which is a continuation of Ser. No. 218,203, Jul. 13, 1988, Pat. No. 5,066,883.

[30] Foreign Application Priority Data

| | | | |
|---|---|---|---|
| Jul. 15, 1987 | [JP] | Japan | 62-174837 |
| Oct. 2, 1987 | [JP] | Japan | 62-250448 |
| Oct. 9, 1987 | [JP] | Japan | 62-255063 |
| Oct. 9, 1987 | [JP] | Japan | 62-255068 |
| Apr. 27, 1988 | [JP] | Japan | 63-102485 |
| Apr. 27, 1988 | [JP] | Japan | 63-102486 |
| Apr. 27, 1988 | [JP] | Japan | 63-102487 |
| Apr. 27, 1988 | [JP] | Japan | 63-102488 |
| Jun. 21, 1988 | [JP] | Japan | 63-154516 |

[51] Int. Cl.[6] ...... H04N 3/14

[52] U.S. Cl. ...... 313/310; 313/309; 313/351; 315/169.3

[58] Field of Search ...... 313/309, 310, 313/336, 346 R, 364 DC, 351, 355; 315/169.3; 357/6

[56] References Cited

U.S. PATENT DOCUMENTS

| | | | |
|---|---|---|---|
| 3,278,789 | 10/1966 | Shroff | 313/346 |
| 3,346,388 | 1/1968 | Zin | 315/169.3 |
| 3,663,857 | 5/1972 | Soellner et al. | 313/339 |
| 3,735,186 | 5/1973 | Klopfer et al. | 313/346 |
| 4,093,562 | 6/1978 | Kishimoto | 252/511 |
| 4,325,084 | 4/1982 | Van Gorkom et al. | 313/346 |

FOREIGN PATENT DOCUMENTS

| | | |
|---|---|---|
| 0073031 | 3/1983 | European Pat. Off. . |
| 1800952 | 7/1971 | Germany . |
| 1764994 | 1/1972 | Germany . |
| 2542349 | 7/1976 | Germany . |
| 2012101 | 3/1978 | Germany . |
| 2413942 | 2/1979 | Germany . |
| 44-27852 | 11/1944 | Japan . |
| 44-27853 | 11/1969 | Japan . |
| 44-28009 | 11/1969 | Japan . |
| 44-26125 | 11/1969 | Japan . |
| 44-32247 | 12/1969 | Japan . |
| 45-31615 | 10/1970 | Japan . |
| 46-20944 | 6/1971 | Japan . |
| 46-20949 | 6/1971 | Japan . |
| 46-20943 | 6/1971 | Japan . |

(List continued on next page.)

OTHER PUBLICATIONS

M. Hartwell et al., "Strong Electron Emission From Patterned Tin–indium Oxide Thin Films", Cambridge MA, pp. 519–521.

M. Elinson et al., "The Emission of Hot Electrons and the Field Emissions Of Electrons From Tin Oxide," *Radio Engineering and Electron Physics*, No. 7, Jul. 1965, pp. 1290–1296.

*Primary Examiner*—Michael Horabik

*Attorney, Agent, or Firm*—Fitzpatrick Cella Harper & Scinto

[57] ABSTRACT

An electron-emitting device is provided which is a laminate including a semiconductor layer with fine particles formed between a pair of opposing electrodes an electron-emitting region insulated from the electrodes is formed at a side end surface of the insulating layer formed at the part at which the electrodes oppose each other, and electrons are emitted from the electron-emitting region by applying a voltage between the electrodes.

22 Claims, 23 Drawing Sheets

FOREIGN PATENT DOCUMENTS

| | | |
|---|---|---|
| 46-24456 | 7/1971 | Japan . |
| 46-38060 | 11/1971 | Japan . |
| 54-1147 | 1/1979 | Japan . |
| 56-18336 | 2/1981 | Japan . |
| 56-71239 | 6/1981 | Japan . |
| 855782 | 8/1981 | U.S.S.R. . |
| 1267029 | 3/1972 | United Kingdom . |
| 1335979 | 10/1973 | United Kingdom . |
| 2060991 | 5/1981 | United Kingdom . |

ELECTRON-EMITTING DEVICE WITH ELECTRON-EMITTING REGION INSULATED FROM ELECTRODES

This application is a continuation of application Ser. No. 08/058,801, filed May 10, 1993, now abandoned, which is a continuation of application Ser. No. 07/694,014, filed Apr. 30, 1991, now abandoned, which is a continuation of application Ser. No. 07/218,203, filed on Jul. 13, 1988, now issued as U.S. Pat. No. 5,066,883 on Nov. 19, 1991.

BACKGROUND OF THE INVENTION

1. Field of the Invention

The present invention relates to an electron-emitting device, and a method of preparing it.

2. Related Background Art

Hitherto known as a device achievable of emission of electrons with use of a simple structure is the cold cathode device published by M. I. Elinson et al (Radio Eng. Electron. Phys., Vol. 10, pp.1290–1296, 1965.

This utilizes the phenomenon in which electron emission is caused by flowing an electric current to a thin film formed with a small area on a substrate and in parallel to the surface of the film, and is Generally called a surface conduction electron-emitting device.

This surface conduction electron-emitting device that has been reported includes those employing a $SnO_2$(Sb) thin film developed by Elinson et al. named in the above, those employing an Au thin film (G. Dittmer, "Thin Solid Films", Vol. 9, p.817, 1972), those employing an ITO thin film, (M. Hartwell and C. G. Fonstad, "IEEE Trans. ED Conf.", p.519, 1975), and those employing a carbon thin film [Hisashi Araki, et al. "SHINKU" (Vacuum), Vol. 26, No. 1, p.22, 1983].

Typical device constitution of these surface conduction electron-emitting devices is shown in FIG. 38. In FIG. 38, the numerals 19 and 20 denote electrodes for attaining electrical connection; 21, a thin film formed using an electron-emitting material; 23, a substrate; and 22, an electron-emitting region.

In these surface conduction electron-emitting devices, it has been hitherto practiced to previously form the electron-emitting region by an energizing heat treatment, called "forming", before effecting the electron emission. More specifically, a voltage is applied between the above electrode 19 and electrode 20 to energize the thin film 21 to bring the thin film 21 to be locally destroyed, deformed or denatured owing to the Joule heat thereby generated, thus forming the electron-emitting region 22 kept in a state of electrically high resistance to obtain an electron-emitting function.

What is meant by the above state of electrically high resistance is a discontinuous state of a film partly having cracks of 0.5 μm to 5 μm on the thin film 21 and having the so-called island structure inside the cracks. What is meant by the island structure is the structure of a film in which fine particles generally having a diameter of several ten angstroms to several micrometers are present on the substrate, and the respective fine particles are spatially discontinuous and electrically continuous.

Hithertofore, in the surface conduction electron-emitting devices, a voltage is applied to the above high-resistance discontinuous film by the electrodes 19 and 20 to flow an electric current to the surface of the device, so that the electrons are emitted from the above fine particles.

However, the forming according to the conventional energizing heat treatment as mentioned above have involved the problems as follows:

(1) In carrying out the energizing heating, it sometimes occurs that the thin film is peeled because of the difference in coefficient of thermal expansion between the substrate and the thin film. This provides limitations in upper limit of heating temperature, materials for the substrate, and combination by selection of materials for the thin film.

(2) In carrying out the energizing heating, the substrate also is locally heated, therefore sometimes resulting in occurrence of fatal cracking therein.

(3) Degree of the changes of a film owing to the energizing heating, as exemplified by the degree of local destruction, deformation or denaturing, tends to become irregular among a plurality of devices formed in the same substrate, and also the site at which changes may occur tends to be not fixed.

For this reason, when functioning as an electron-emitting device, irregularity in the shape of beams of emitted electrons has been seen for each device.

(4) A relatively large electric power is required until the forming is completed. For this reason, an electric source of large capacity is required when a number of devices are formed on the same substrate and the forming is carried out simultaneously.

(5) A relatively long period of time is required for conventional forming processes that start with the energizing heating and end with cooling. For this reason, an excessively long time is required for carrying out the forming of a number of devices.

Because of the problems as set out above, the surface conduction electron-emitting devices have not been positively applied in industrial fields, notwithstanding their advantages that the device has simple construction.

SUMMARY OF THE INVENTION

The present invention was made to eliminate the disadvantages in the prior art as discussed above, and an object thereof is to provide an electron-emitting device that can have, without applying the treatment called forming, a quality more than equal to that of electron-emitting devices obtained by the forming, and has a novel structure suffering less irregularity of characteristics, and a method for preparing it.

More specifically, the present invention firstly provides a means for preparing the device by controlling the above-mentioned shape and width of cracks without use of the forming means, and with ease, and provides an electron-emitting device with regular characteristics, prepared by the method using the means.

It secondly provides a means for making uniform the structure and size corresponding to the island structure in the cracks mentioned above, and provides an electron-emitting device having regular characteristics by using the means.

A further object of the present invention is to provide an electron-emitting device capable of controlling the above characteristics and also capable of better controlling the position of the electron-emitting region, and a method for preparing such a device.

A still further object of the present invention is to provide an electric current emitting device that not only can solve the problems previously mentioned, but also can make lower the voltage to be applied to electrodes and achieve improvement in the density of an emitted electric current.

According to an aspect of the present invention, there is provided an electron-emitting device comprising a laminate comprising an insulating layer held between a pair of electrodes opposing each other, wherein an electron-emitting region insulated from said electrodes is formed at a side end surface of the insulating layer formed at the part at which the electrodes oppose each other, and electrons are emitted from said electron-emitting region by applying a voltage between said electrodes.

According to another aspect of the present invention, there is provided an electron-emitting device comprising a device structure in which an insulating layer is formed between opposing electrodes and fine particles are arranged inside the layer of said insulating layer in a dispersed state.

According to a further aspect of the present invention, there is provided an electron-emitting device comprising the device structure that a semiconductor layer is formed between opposing electrodes, and fine particles are arranged inside the layer, or on the layer, of said semiconductor layer in a dispersed state.

DETAILED DESCRIPTION OF PREFERRED EMBODIMENTS

More specifically, the present invention is an electron-emitting device comprising a laminate comprising an insulating layer disposed between a pair of opposing electrodes, wherein an electron-emitting region insulated from the electrodes is provided at a side end surface of the insulating layer formed at the part at which the electrodes oppose each other, and electrons are emitted from the electron-emitting region by applying voltage between the electrodes.

Figure 1:
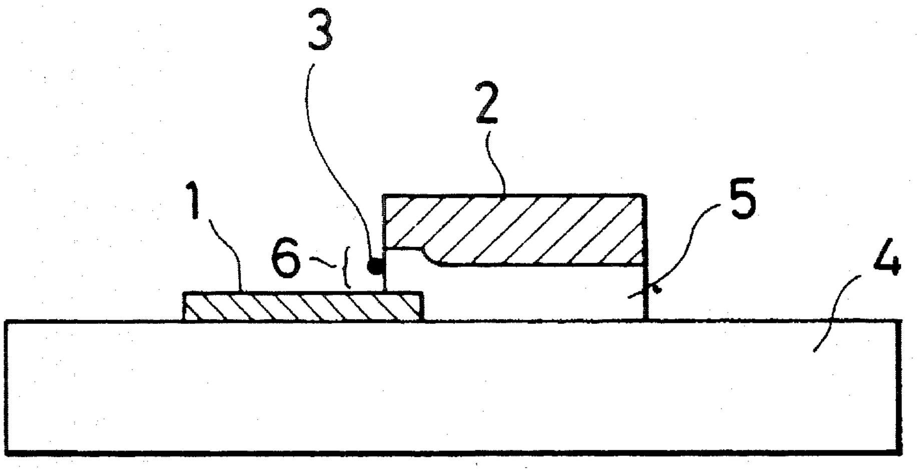
FIGS. 1–2, 3(*a*), 3(*b*), 4–5, 6(*a*), 6(*b*) and 7 are cross sections illustrating vertical type electron-emitting devices of the present invention.

FIG. 1 diagrammatically illustrates a first embodiment of the electron-emitting device of the present invention. In the figure, the numerals 1 and 2 denote electrodes for obtaining electrical connection; 3, an electron-emitting region; 4, a substrate; and 5, an insulating layer.

In FIG. 1, the electron-emitting device of the present invention comprises a laminate comprising the insulating layer 5 disposed between a pair of the electrodes 1 and 2 opposing each other at their end portions, wherein the electron-emitting region 3 insulated from the electrodes is provided at a side end surface of the insulating layer 5 formed at the opposing part at which the electrodes 1 and 2 oppose each other, and electrons are emitted from the electron-emitting region 3 by applying voltage between the electrodes 1 and 2.

In the above electron-emitting device, the one corresponding to the narrow crack in the prior art can depend on the film thickness of the insulating layer 5. More specifically, as illustrated in FIG. 1, taking the structure that a pair of the electrodes are formed above and beneath the insulating layer with respect to the direction of the lamination in which the insulating layer having the electron-emitting region is laminated to the substrate (hereinafter referred to as "vertical type structure") can make small the thickness of the insulating layer on which the spacing between electrodes depend.

The electron-emitting device having the vertical type structure has a quality more than equal to that of conventional ones without taking the forming means, and can give a more improved electron-emitting device that can make uniform the shape and width of the electron-emitting region.

In FIG. 1, the insulating layer 5 may have a thickness of from several angstroms to several microns, for example, from 10 angstroms to 10 microns, preferably from 10 to 1 μm.

The insulating layer 5 is comprised of $SiO_2$, MgO, $TiO_2$, $Ta_2O_5$, $Al_2O_3$ or the like, a laminated material of any of these, or a mixture of any of these, which is formed by vacuum deposition or coating. Alternatively, when the electrode 1 is comprised of a metal such as Al and Ta, the insulating layer 5 may comprise an anodic oxidation film anodized by electrolysis.

The substrate 4 is formed with glass, ceramics or the like, and the electrodes 1 and 2 are formed with Au, Ag, Cu, Mo, Cr, Ni, Al, Ta, Pd, W or the like, or an alloy of any of these, or carbon, etc.

The electrodes 1 and 2 may have a thickness of from several hundred angstroms to several μm, preferably from 0.01 to 2 μm in the case of the vertical type. Formation methods include vacuum deposition, photolithography, and printing.

An outline of the method of preparing the electron-emitting device according to the present invention can be specifically described based on FIG. 1 as follows:

The electrode 1 is vapor deposited on the substrate 4, and then subjected to patterning to give a desired shape as exemplified by a stripe. Thereafter, the insulating layer 5 is formed by means of vacuum deposition, coating or the like. Thickness of the insulating layer depends on the dielectric strength depending on materials for the insulating layer, and the threshold voltage at which emission of electrons begins by the voltage applied between the electrodes 1 and 2.

Usually, to set the threshold voltage to from 10 to 20 V, this film thickness must be 1 micron or less. After formation of the insulating layer 5, the electrode 2 is formed by conventional vacuum deposition, printing, coating or the like process, and then the electrode 2 and the insulating layer 5 are so subjected to patterning along the pattern of the electrode 1 that they may partly overlap with the electrode 1 in the same pattern. (See FIG. 1. ) In that occasion, the electron-emitting region 3 may be obtained by disposing an electron-emitting layer 3*a* between the insulating layers 5*a* and 5*b* according to the manner as described later, or may be obtained by disposing electron-emitting bodies 3*b* at the side face of the insulating layer 5.

Figure 2:
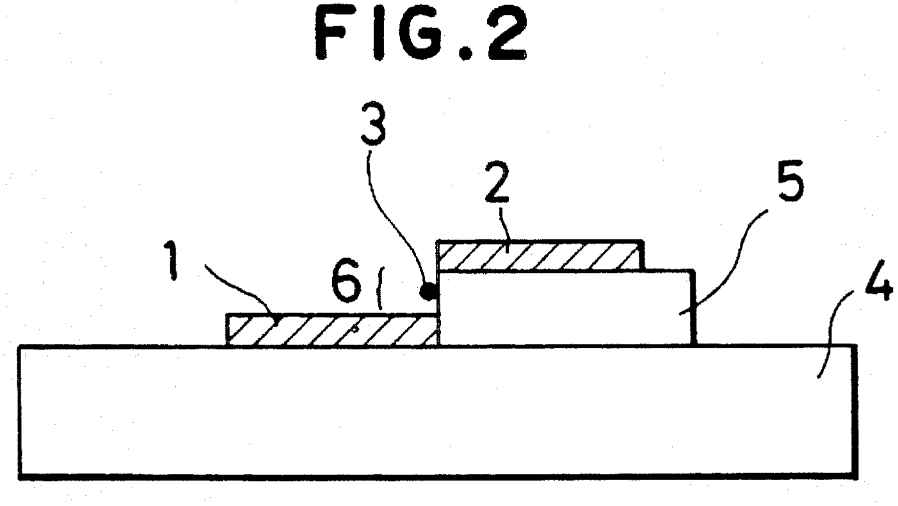

Good results can also be exhibited not only by taking the structure in which the electrodes 1 and 2 overlap as shown in FIG. 1, but also by an electron-emitting device comprising the electron-emitting region 3 disposed at a side end surface defined between a pair of electrodes 1 and 2 that oppose at their end portions but have no overlap as shown in FIG. 2

The electron-emitting region 3 is formed by disposing an electron-emitting layer 3*a* in the insulating layer 5 comprised of a material readily capable of field emission of electrons, a material readily capable of secondary electron emission, or a material readily capable of emitting electrons by electron bombardment and having strong thermal resistance and corrosion resistance, as exemplified by metals such as W, Ti, Au, Ag, Cu, Cr, Al and Pt, oxides such as $SnO_2$, $In_2O_3$, BaO and MgO, or carbon or a mixture of any of the above, each having a low work function and high thermal resistance, utilizing vacuum deposition, coating, sputtering deposition, dipping, or the like process.

Alternatively, it may comprise a thin coating comprising superfine particle powder of metals as exemplified by Au, Ag, Cu, Cr and Al, or can be also formed by arranging electron-emitting bodies 3*b* at the side face of the insulating layer 5 comprising a thin coating of the material as described for the above electron-emitting layer 3*a*. (Utilizable coating methods include spreading, all sorts of vacuum deposition, and dipping.)

Electrode spacing 6 in FIG. 1 and FIG. 2 somewhat differs, but in approximation may desirably be formed in from several ten angstroms to several μm. Preferably from several ten angstroms to 2 μm, and more preferably from 10 angstroms to 1 μm.

An outline of a method for preparing the electron-emitting device illustrated in FIG. 2 will be described below.

An insulating layer 5 is formed on a substrate 4, and a stepped portion is formed by patterning. Thereafter the electrodes 1 and 2 are simultaneously formed into films so that the stepped portion may not be covered by the electrodes, thus forming the electrode spacing 6. Accordingly, the electrode spacing 6 depends on thickness of the electrode formed at the stepped portion set with the film thickness of the insulating layer 5. The film formation of this electrode is carried out usually by using vacuum film formation or a similar process, so that it is possible to control the film thickness in high precision. Thus, for the electrode spacing 6, small spacing of several ten angstroms can be readily obtained in high precision.

The stepped portion at which the electrode spacing 6 is formed can also be obtained by pattern etching of the substrate 4 itself, without using the insulating layer 5. There is also available a method in which the electrodes 1 and 2 are formed on this stepped portion to obtain an electron-emitting device. (See FIG. 7.)

Taking the structure that a pair of the electrodes opposing each other have no mutual overlap as illustrated in FIG. 2 can bring about a more superior electron-emitting device suffering less increase in driving power consumption that may be otherwise caused by increase in the electrical capacity at the part at which the electrodes overlap, less delay of driving electric signals, and less influence by dielectric strength or pinholes of the insulating layer.

Figure 7:
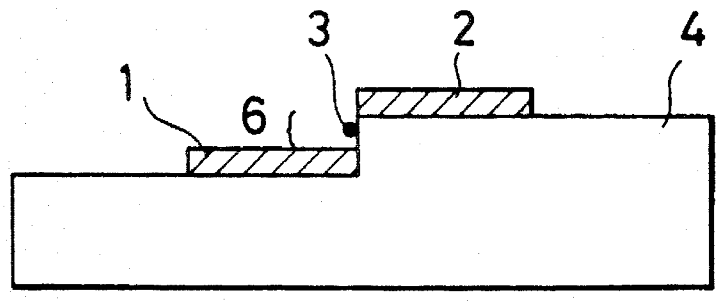

On the other hand, the electron-emitting device having the structure as shown in FIG. 7 makes it unnecessary for the electrodes to be held by the insulating layer, and makes it possible also to obtain the spacing of the opposing electrodes by utilizing the stepped portion, so that if, for example, the electrodes-supporting substrate itself is etched to provide the stepped portion, there is given an electron-emitting device that can be obtained without formation of any insulating layer, making simple its preparation processes.

Figure 4:
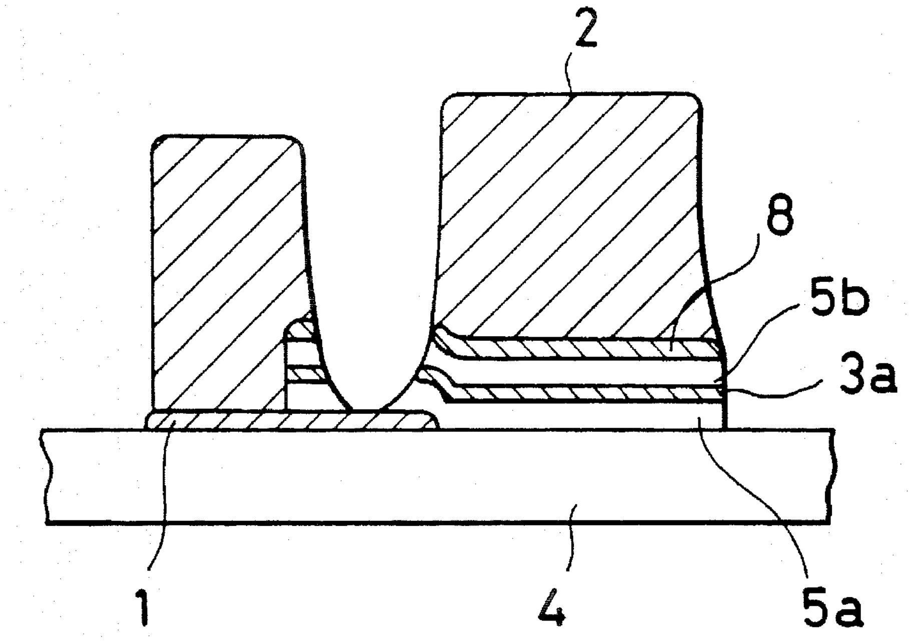

The electron-emitting device of the present invention may further have the structure as shown in FIG. 4.

Figure 3A:
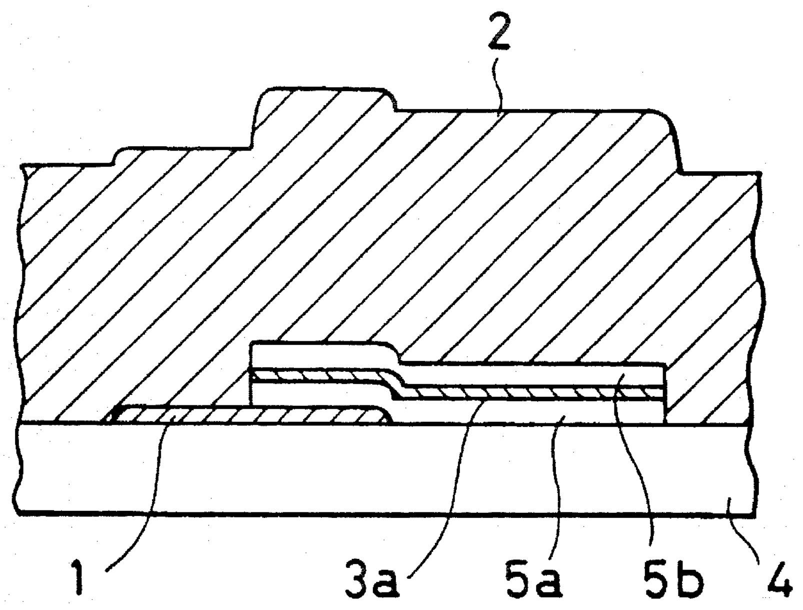
Figure 3B:
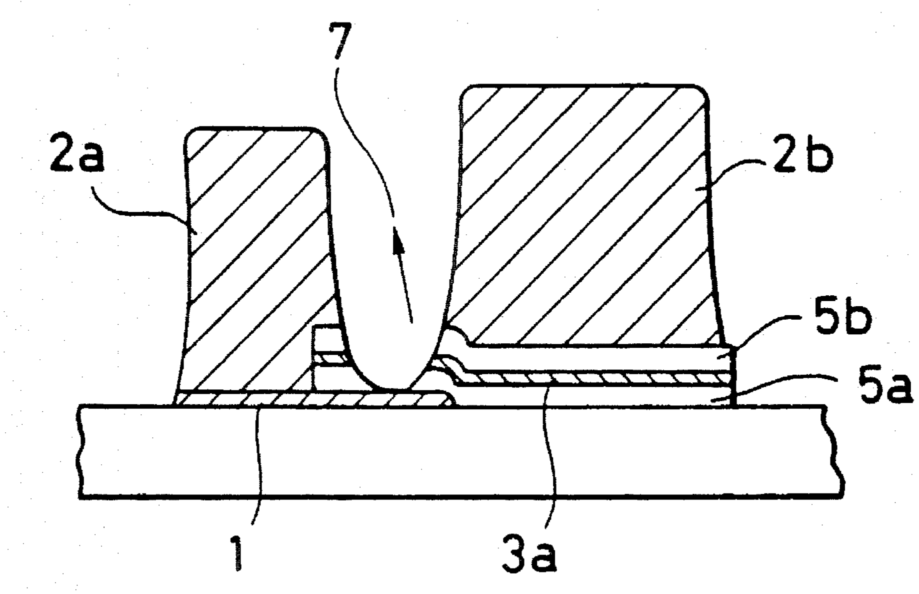

In FIG. 4, the numerals 1 to 5 denotes the same as those in FIG. 3. In the present figure, the numeral 8 denotes an intermediate layer, which is disposed between the insulating layer 5 and the electrode 2 to constitute a multi-layer electrode. The intermediate layer 8 plays a role to bring about the effect of preventing sputtering damage caused by electrons or ions in the electrode 2, or the effect of bringing electrons to more readily emit. As the intermediate layer 8, high-melting materials as exemplified by W, $LaB_6$, carbon, TiC and TaC may be used to make small the sputtering damage, and materials having a low work function as exemplified by $SnO_2$, $In_2O_3$, $LaB_6$, BaO, CS and CSO may be used to achieve improvement in electron emission efficiency.

There may be also used a laminate, or a mixture, comprising these both materials. Of course, similar effect can be obtained also when the intermediate layer 8 is provided on the electrode 1 to give a multi-layer electrode. Further, when both the electrodes are made to comprise the multi-layer electrode, suitable materials for the intermediate layer 8 can be selected for each electrode. Also, a laminate comprising an insulating layer 5*a*, an electron-emitting layer 3*a* and an insulating layer 5*b* may be made to comprise a multi-layer laminate constituted of, for example, an insulating layer 5*a*, an electron-emitting layer 3*a*, an insulating layer 5*b*, an electron-emitting layer 3*a*, an insulating layer 5*a*, and an electron-emitting layer 3*a*. At least one layer of the multilayer electrodes, as exemplified by the electrode 2 in FIG. 4, may further preferably be comprised of a material having a high electrical conductivity. This is because the materials for the intermediate layer 8 are materials having relatively low electrical conductivity as for electrode wiring materials.

An excessively high wiring resistance of a device may cause an increase in the power consumption or a delay in the driving signals, resulting in undesirableness in driving the device. For this reason, the materials having high electrical conductivity is used in the electrode 2 to keep to a low level the wiring resistance of the whole multilayer electrode. Usable as the materials having high electrical conductivity are Ag, Al, Cu, Cr, Ni, Mo, Ta, W, etc.

In FIG. 4, when the electron-emitting layer 3*a* comprises the material suffering less sputtering damage or having a low work function, the intermediate layer 8, or the electrode 1 and the intermediate layer 8, may be formed with use of the same materials as in the electron-emitting layer 3*a*.

The present invention further provides an electron-emitting device having a device structure wherein an insulating layer is formed between electrodes opposing each other, and fine particles are contained in said insulating layer and at the same time arranged in a dispersed state.

Taking the above described device structure of the present invention not only can solve the problems in the prior art previously discussed, but also can provide an electron-emitting device capable of obtaining an emitted electric current of high density by using a low electric power and also capable of controlling the island spacing, island size of the islands previously mentioned. This electron-emitting device will be described below with reference to the drawings.

Figure 8:
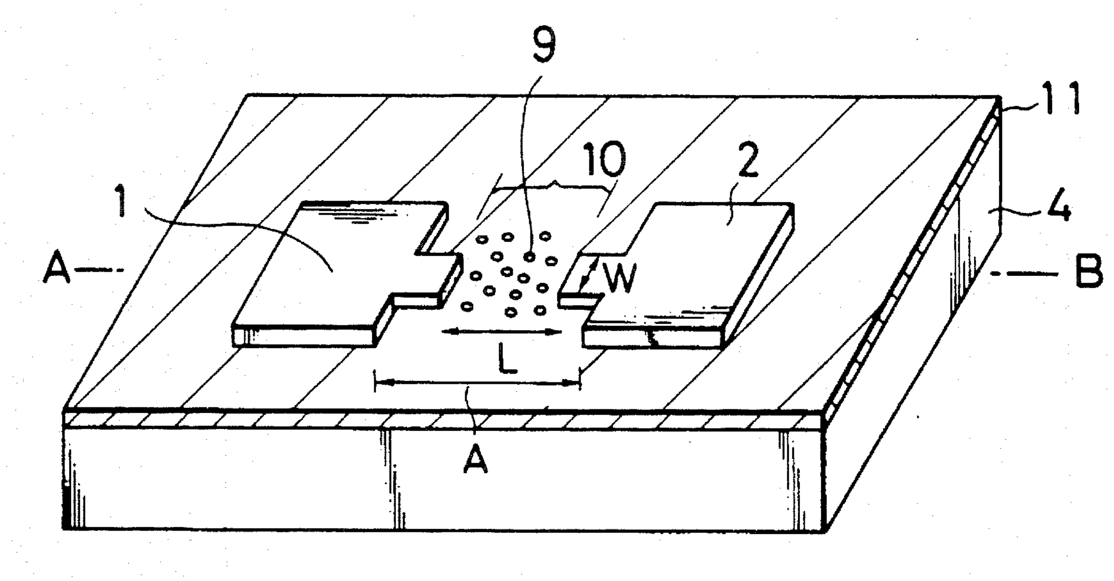
FIG. 8 is a perspective view illustrating an electron-emitting device of the present invention having an insulating layer comprising fine particles arranged in a dispersed state.
Figure 9:
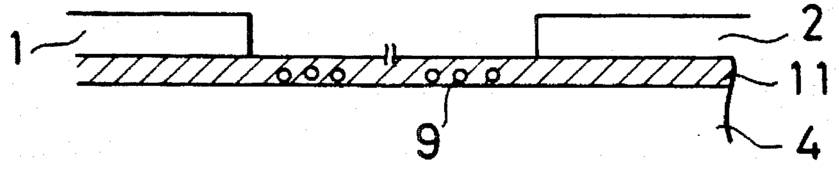
FIG. 9 and FIG. 10 are cross sections along the line A to B in FIG.
Figure 10:
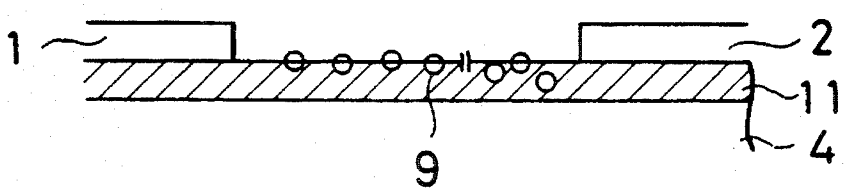

In FIG. 8, provided on a substrate 4 such as glass and ceramics is an insulating layer 11, and further thereon electrodes 1 and 2 comprised of low-resistance materials for use in voltage application are provided giving minute spacing to form a discontinuous electron-emitting region 10 comprising fine particles 9 dispersed between them. Though not shown in the drawing, a space is taken at an upper area of the electron-emitting region to provide there a lead-out electrode for leading out emitted electrons. Application of voltage between the electrodes 1 and 2 in vacuo (this voltage is assumed as $V_f$) brings about flow of electricity between the electrodes ($I_f$) to apply voltage using the lead-out electrode as the anode, so that electrons are emitted from the electron-emitting region in the direction substantially vertical to the paper surface in the emission is assumed as $I_e$. ) drawing. (The electric current for this electron FIG. 9 and FIG. 10 diagrammatically illustrate cross sections in the A-B direction in FIG. 8. In the present figures, the fine particles on the substrate 4 may preferably have a particle diameter of from several ten angstroms to several μm, and the spacing between respective fine particles may further preferably be formed in the range of from several ten angstroms to several μm.

Materials for the fine particles used in the present invention may cover a very wide range, and almost all of conductive materials including usual metals, semimetals and semiconductors. Particularly suitable are usual cathode materials having properties such as low work function, a high melting point and low vapor pressure, thin film materials capable of forming the surface conduction electron-emitting device by the conventional forming treatment, and materials having a large coefficient of secondary electron emission.

Appropriate materials may be selected from such materials according to purposes and used as the fine particles, so that a desired electron-emitting device can be formed.

Specifically, they may include, for example, borides such as $LaB_6$, $CeB_6$, $YB_4$, and $GdB_4$, carbides such as TiC, ZrC, HfC, TaC, SiC and WC, nitrides such as TiN, ZrN and HfN, metals such as Nb, Mo, Rh, Hf, Ta, W, Re, It, Pt, Ti, Au, Ag, Cu, Cr, Al, Co, Ni, Fe, Pb, Pd, Cs and Ba, metal oxides such as $In_2O_3$, $SnO_2$ and $Sb_2O_3$, semiconductors such as Si and Ge, carbon, and AgMg. The present invention is by no means limited by the above materials. Moreover, in the present invention, it may also be practiced to select different materials among the above materials and disperse fine particles of two or mote kinds of different materials.

A method for preparing the device illustrated in FIG. 8 will be described below.

Figure 11:
FIGS. 11(1), 11(2) 11(3), 11(4) 11(5) and FIGS. 14(1), 14(2), 14(3), 14(4) and 14(5) are views explanatory of the preparation processes of electron-emitting devices of the present invention.
Figure 11:
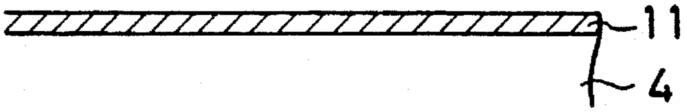
Figure 11:
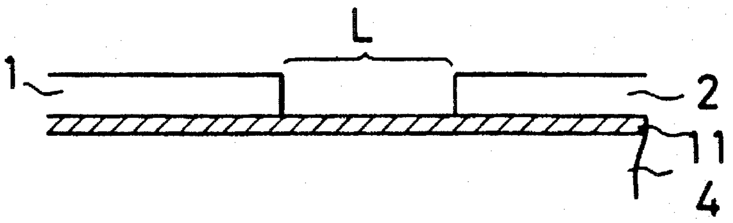
Figure 11:
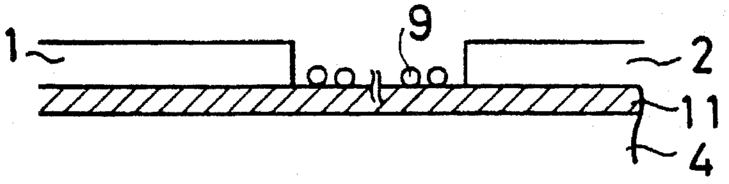
Figure 11:
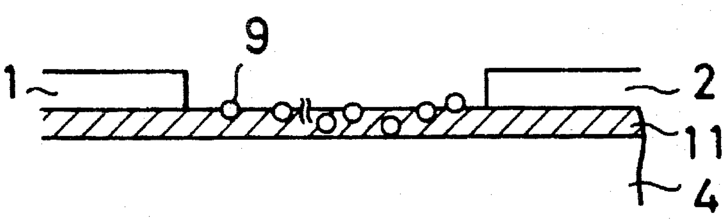

FIG. 11 (1) to (5) illustrate cross sections of a device for each preparation step.

(1) The surface of a substrate 4 comprised of glass or ceramics is degreased and cleaned.

(2) An insulating layer 11 comprised of low-melting point glass is formed into a film on the surface of the substrate 4 according to liquid-coating baking, printing baking, vacuum deposition, or the like process. Desirable as materials for the low melting point glass are those having a softening point temperature lower than the distortion point temperature of the substrate and at the same time having a coefficient of thermal expansion close to that of the substrate. In general, a lead oxide type low melting glass has a softening point of about 400° C. and also has a coefficient of thermal expansion close to the coefficient of thermal expansion of a soda lime glass substrate generally used. The insulating layer 11 may desirably be formed to have a thickness in the range of from several ten angstroms to several ten μm in approximation.

(3) On the insulating layer obtained in (2), electrodes 1 and 2 are formed according to vacuum deposition, photolithoetching, lifting-off, printing, or the like process.

Usable as electrode materials are the same materials as those described in relation to FIG. 1, i.e. Au, Ag, Cu, Mo, Cr, Ni, Al, Ta, Pd and W, or an alloy of any of these or carbon, etc., and the electrodes 1 and 2 may also suitably have a thickness of from several hundred angstroms to several μm, preferably from 0.01 to 2 μm.

As to the dimension of electrode spacing L, the electrodes may suitably oppose each other with a space of from several hundred angstroms to several ten μm, and spacing width W may suitably be approximately from several μm to several mm. However, they are by no means limited to these dimensions.

(4) Next, the fine particles 9 are coated on the electrode gap region obtained in (3). A dispersion of fine particles are used in the coating. Fine particles and an additive to promote dispersion of the fine particles are added in an organic solvent comprised of butyl acetate, alcohol or the like, followed by stirring or the like to prepare the dispersion of fine particles. This fine particle dispersion is coated on the surface of a specimen according to dipping, spin coating or the like process, and then calcination is carried out for about 10 minutes at a temperature at which the solvent or the like may be evaporated, for example, at 250° C. Thus the fine particles are arranged on the surface of the insulating layer 11 in the electrode spacing L. Of course, the fine particles 9 are arranged on the whole surface of the specimen, but no difficulty is brought about as there is applied substantially no voltage to the fine particles 9 outside the electrode spacing L when electrons are emitted. This is accordingly not shown in the drawing. Arrangement density of the fine particles 9 may vary depending on the coating conditions and how to prepare the fine particle dispersion, and the amount of electric currents flowing to the electrode spacing L may also vary in accordance with this. In addition to the above formation by coating, also available as a method for dispersing the fine particles 9 to the electrode gap region obtained in (3) is, for example, a method in which a solution of an organic compound is coated on the substrate followed by thermal decomposition to form metal particles. In regard to materials feasible for vacuum deposition, the fine particles can be also formed by control of vacuum deposition conditions such as substrate temperature or by a means like vacuum deposition such as masked vacuum deposition.

(5) After this, the specimen obtained through the steps up to (4) is heated to a temperature higher than the softening point of the low-melting glass constituting the insulating layer 11, for example, to 450° C. if it is the lead oxide type low-melting glass, to carry out baking for about 20 minutes. By this procedure, the fine particles 9 arranged on the insulating layer 11 comprised of the low-melting glass penetrate into the low-melting glass, resulting in being included (or enclosed) into the insulating layer 11, or included to the extent that at least part of a particle is exposed from the insulating layer 11, and then fixed there.

Whether the fine particles 9 are brought into the state that all of them are included into the insulating layer 11 or the state that only part of a particle penetrates into the insulating layer 11 in the state that the surface remains exposed, may be adjusted by selecting the baking temperature in the step (5).

The higher the baking temperature is, the more readily the fine particles 9 are penetrated deeply into the insulating layer 11, and are included and fixed. A lower baking temperature may make it difficult for the fine particles 9 to penetrate into the insulating layer 11, and tend to make them fixed in the exposed form.

Some of the materials such as Pd listed in the above embodiment may be covered on their surfaces with oxide films as a result of heating in the above step (5), resulting in decrease in the amount of the electric current flowing to the electrode spacing L. Therefore, a step of pickling to remove the oxide film may be introduced if necessary.

In the present invention, the device may also be formed by bringing the fine particles 9 to be completely included into the insulating layer 11 and thereafter carrying out etching to bring part of each particle to be exposed.

Figure 12:
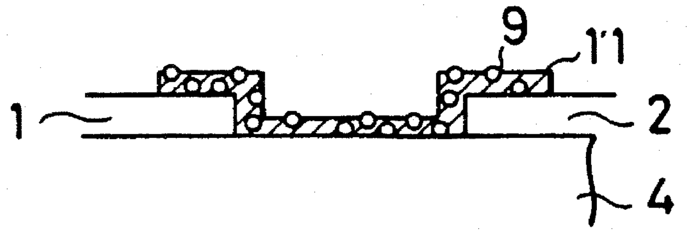
FIGS. 12, 13(1), 13(*b*), 15(*a*), 15(*b*), 16(*a*) and 16(*b*) diagrammatically illustrate electron-emitting devices according to other embodiments of specific structures of the present invention.
Figure 13A:
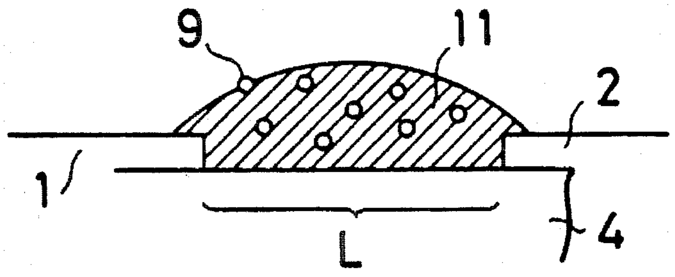
Figure 13B:
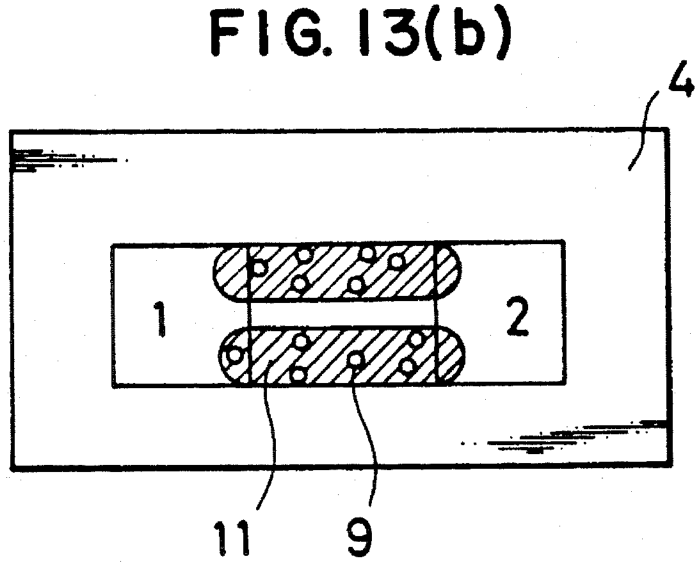

Not only the device prepared according to the above preparation steps, having the structure as illustrated in FIG. 11, but also the devices having the structure illustrated in FIG. 12 and FIG. 13(*a*) and (*b*) can also exhibit good results.

Preparation processes in FIG. 12 will be described.

Electrodes 1 and 2 are formed on a substrate 4, on which a fine particle dispersion or a dispersion prepared by mixing low-melting frit Glass into an organic metal compound solution is coated in the vicinity of the electrode spacing region L, followed by baking at a temperature higher than the softening point of the low-melting frit Glass crystalline melting point to bring the fine particles to be included into an insulating layer 11 comprised of the low-melting glass, or bring at least part thereof to be exposed, and then fixed. Here, the baking temperature set to a higher degree (as exemplified by 650° C. enables the smoothing of the insulating layer 11 to make a continuous film.

In the figure, the insulating layer 11 may preferably be formed to have a film thickness of from several ten angstroms to several Nm in approximation.

Here, a liquid coating insulating layer (as exemplified by Tokyo Ohka OCD, a $SiO_2$ insulating layer) may be used in place of the low-melting frit glass.

In the instance where the liquid coating insulating layer is used, it is also possible to obtain the electron-emitting device of the present invention in the following manner: First,the insulating layer 11 containing the fine particles 9 is built up on the substrate 4 according to liquid coating. Namely, it can be obtained by coating the fine particles mixed and dispersed in a liquid coating preparation, on a substrate by spin coating, dip coating or the like.

Next, electrodes are formed on the insulating layer 11 according to the above processes such as vacuum deposition to make up an electron emission device.

Taking said process, the fine particles are coated on the substrate in the state that they are mixed and dispersed in the liquid coating preparation or the like for obtaining the insulating layer, and therefore, even after the coating and baking, they remain dispersed in a good state in the film formed by coating the liquid coating preparation for obtaining the insulating layer. Accordingly, the fine particles suffer less agglomeration, and can be uniformly dispersed in the insulating layer obtained by the liquid coating preparation.

Also, since in the present structure the insulating layer containing fine particles is first formed on the substrate, the substrate surface before formation of the insulating layer is usually a uniform surface without any particular pattern or roughness. Accordingly, since the insulating layer containing the fine particles in its uniform surface is formed by coating and baking, there is no non-uniformity in the film thickness or fine particle dispersion owing to coating uneveness at the part of the pattern or roughness, so that a support layer in which the fine particles are dispersed can be uniformly formed on the substrate surface. Obtaining the insulating layer that is uniform like this can make small the irregularity or the like in device characteristics when a number of electron-emitting devices are provided on the same substrate.

Moreover, although in the present structure an in-air heating step at about 400° C. or more becomes necessary, for example, when the oxide type insulating layer is formed using the liquid coating preparation, the electrodes themselves do not pass through the heating step because the insulating layer formation heating is carried out before formation of the electrodes. Therefore, no account is required to be taken for the thermal oxidation of electrodes or thermal diffusion with respect to the insulating layer, thus enabling expansion of the range of selection for electrode materials.

Accordingly, the materials may be appropriately selected depending on the conditions such as dielectric strength, thermal resistance, workability, oxidation resistance, life, specific resistance, and amount of electric current that can be taken out. The materials for the insulating layer may include, as previously described, $SiO_2$, MgO, $TiO_2$, $Ta_2O_5$ and $Al_2O_3$, or a laminate or mixture of any of these. The film thickness may be from about 10 angstroms to several um or so, which is the thickness necessary for the fine particles 9 to be dispersed and fixed.

The electron-emitting device may also have the structure as illustrated in FIG. 13.

In the electron-emitting device illustrated in FIG. 13, a fine particle dispersion prepared by mixing the low-melting frit glass for the insulating layer 11 is coated (here, carried out in the same manner as described in relation to FIG. 12), and thereafter the insulating layer 11 is formed into a discontinuous island-shaped film by setting the baking temperature to somewhat lower degree (for example, about 500° C.).

In the electron-emitting device illustrated in FIG. 13, the insulating layer 11 does not entirely cover the electrode spacing L as so illustrated in the figure, so that it takes the form that the electrode ends of the electrodes 1 and 2, on the side of the electrode spacing L, i.e., the part at which a highest electric field is generated, is connected with the surface and inside of the insulating layer 11. For this reason, the degree of freedom of the electric current flow path becomes greater, so that the amount of electric current flowing between the electrodes can be more increased than the device of FIG. 12.

Both the electron-emitting device of FIG. 12 and the electron-emitting device of FIG. 13, in which the insulating layer and the fine particles can be formed simultaneously, have the advantage that the preparation steps can be simplified.

Figure 14:
Figure 14:
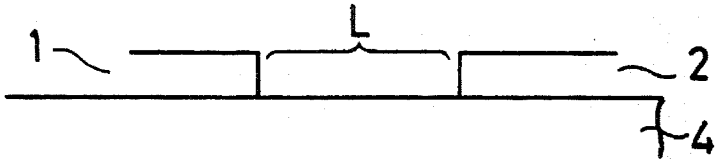
Figure 14:
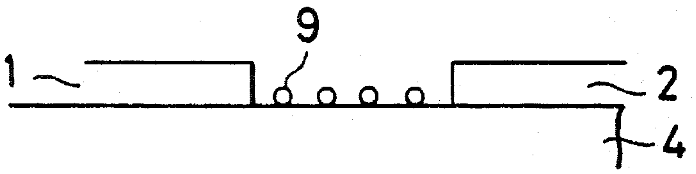
Figure 14:
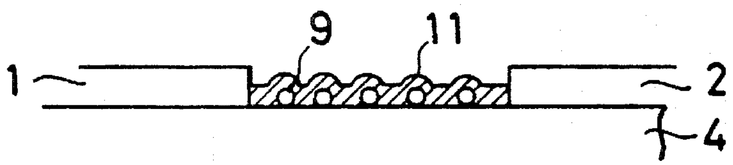
Figure 14:
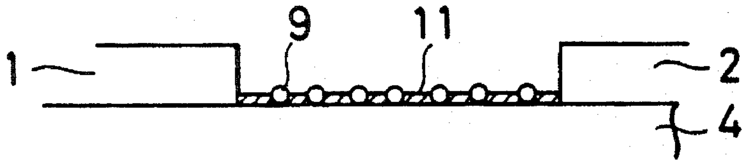

The electron-emitting device of the present invention may further comprise a device having the structure as illustrated in FIG. 14(5).

In FIG. 14, the numeral 4 denotes a substrate; 1 and 2, electrodes; 9, fine particles; and 11, an insulating layer.

FIG. 14 (1) to (5) illustrate cross sections of a device for each preparation step.

1) The surface of the substrate 4 is degreased and cleaned.

2) The electrodes 1 and 2 are formed in the same manner as in (3) in FIG. 11.

3) The fine particles are dispersed in the same manner as in step (4) in FIG. 11.

4) The insulating layer 11 is formed by a method of EB vacuum deposition, sputtering, or vacuum deposition such as plasma CVD, heat CVD or the like process. Usable as materials for the insulating layer 11 are oxides such as $SiO_2$ and $Al_2O_3$, nitrides such as $Si_3N_4$, carbides such as SiC and TiC, as well as glass obtained by vacuum deposition or solution-coated baking, and insulating layers comprising organic polymers such as polyimides. Also, the layer 11 may desirably have a film thickness of from several 10 angstroms to several μm. Here, in general, the insulating layer 11 is deposited also on the surface of fine particles 9, and so deposited that the particle diameters of the fine particles 9 may produce convexes.

The electron emission device prepared according to the above steps 1) to 4) can serve as a device having far superior characteristics as compared with the conventional deviced prepared using the forming. In the electron-emitting device of the present invention, even the device obtained according to the steps 1) to 4) can exhibit sufficiently good characteristics, but more preferred is a device applied with the following step 5), since the extent of exposure of the fine particles fixed in the insulating layer can be made adjustable by adjusting the deposit thickness of the insulating layer and the amount of etching, and furthermore it becomes possible to control the electric current between electrodes and also control the amount of electron emission.

5) Etching is applied on the surfaces of the convexes of the insulating layer 11 obtained in 4). For example, ion milling may be carried out in the state that the specimen is obliquely set, so that the surfaces of the convexes of the insulating layer 11 are etched. As a result, there is given the structure that part of each fine particle 9 is exposed from the insulating layer 11 at the etched portions and also fixed in the insulating layer 11.

In addition, in the above steps 1) to 5), the low-melting glass may be used as the material for the insulating layer 11 and, after step 5) in FIG. 14, the specimen may be baked at a temperature higher than the softening point of the low-melting glass, so that the fine particles 9 can be further firmly fixed in the insulating layer 11 comprised of the low-melting glass. This makes it possible to provide a further stable electron-emitting device.

Figure 15A:
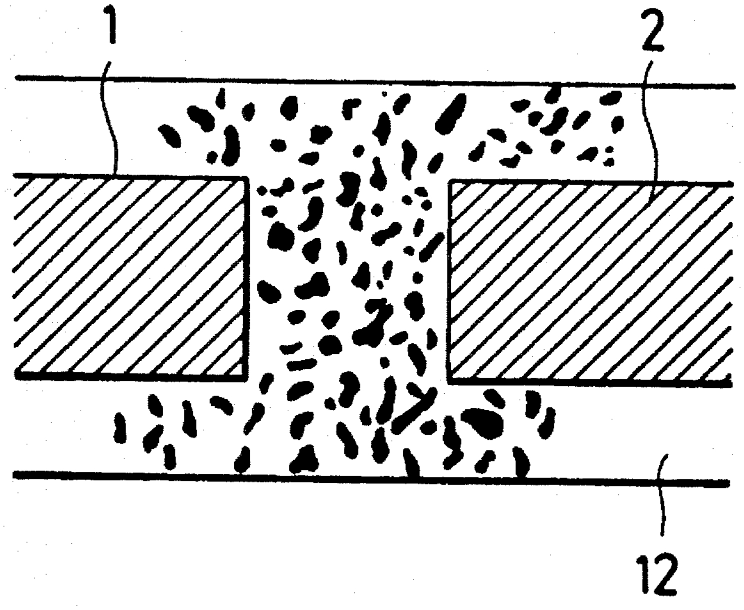
Figure 15B:
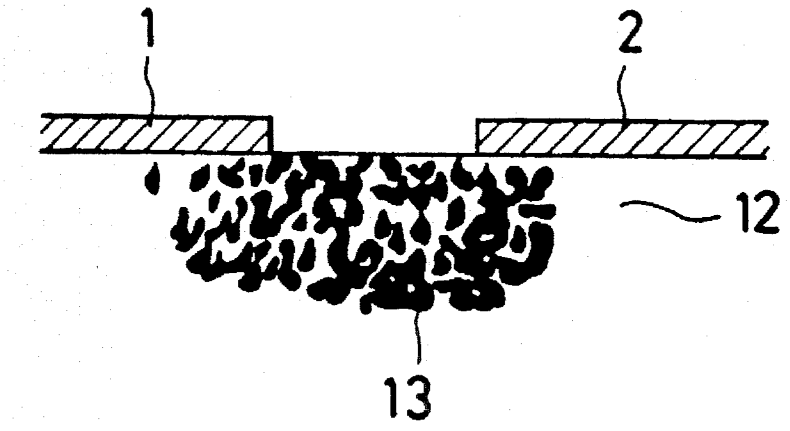
Figure 16A:
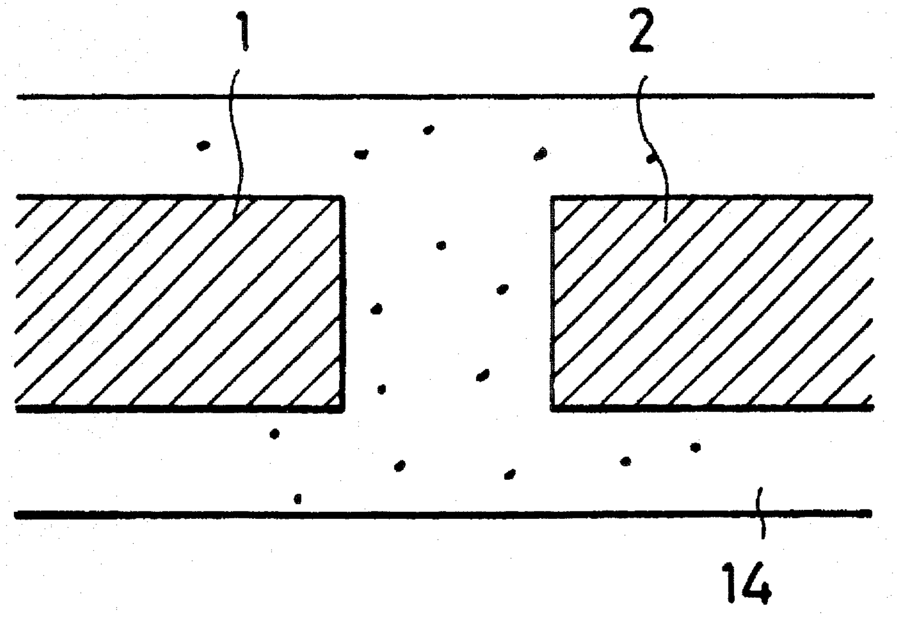
Figure 16B:
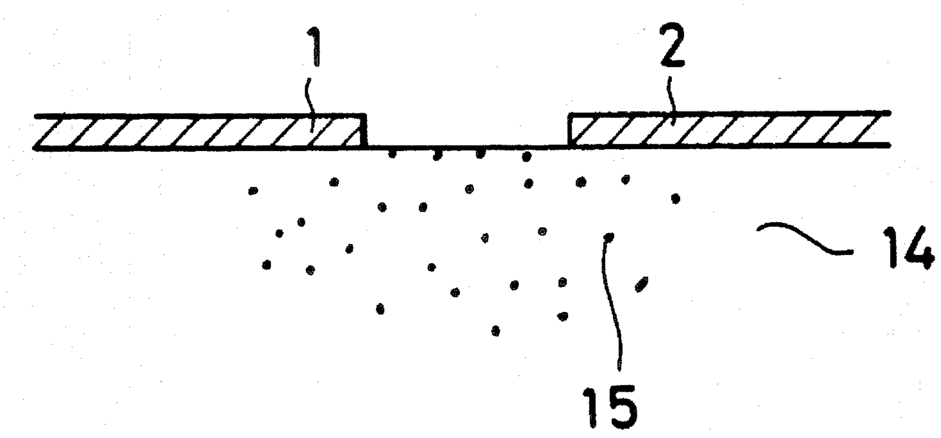

The electron-emitting device of the present invention may also comprise those as illustrated in FIG. 15 (*a*) and (*b*) and FIG. 16 (*a*) and (*b*).

In FIG. 15, the numeral 12 denotes a substrate comprising metals 13 such as Ag, Ba, Pb, W and Sn or metal oxides 13 such as BaO, PbO and $SnO_2$ deposited in porous glass. The numerals 1 and 2 denote electrodes provided on the substrate.

Usable as the above porous glass are Vycor glass available from Corning Glass Works or porous glass MPG available from Asahi Glass Co., Ltd., and those having a pore size of from 40 angstroms to 5 μm, more preferably having a pore size of from 100 angstroms to 0.5 pm. Fine particles of metals or metal oxides of the size equal to or smaller than the pore size are deposited in the pores. The present embodiment may not be limited to the porous glass, and may be worked using those obtained by toughening the glass surface with an aqueous hydrofluoric acid solution or other porous insulating substrates.

Bringing metals to be deposited and fixed in the pores of porous glass can be achieved by commonly available methods as exemplified by a method in which porous glass is impregnated with an aqueous solution of a nitrate such as $AgNO_3$, $Ba(NO_3)_2$ and $PbNO_3$ or an aqueous sulfuric acid solution, followed by drying and thereafter baking in a reducing atmosphere. To deposit the metal oxides, the deposited metals may be baked at a suitable temperature and in an atmosphere of oxygen.

In bringing the metals or metal oxides to be projected from the surface of porous glass, the glass surface may be treated for 1 minute with a hydrofluoric acid solution, followed by washing and drying. A desired substrate 12 can be thus prepared.

The above substrate 12 may more preferably have a thickness of 0.5 μm or more because of the roughness on the surface of porous glass.

In FIG. 16, the numeral 14 denotes a glass substrate commonly called as colored glass, which is glass that contains metal colloid fine particles 15. The numeral 1 or 2 denotes an electrode provided on the substrate. The metal colloid fine particles in the colored glass may suitably have a particle diameter of from 20 angstroms to 6,000 angstroms, more desirably from 100 angstroms to 2,000 angstroms. Also, the density of the fine particles, though variable depending on the particle diameter or materials for the fine particles, may suitably be in such a state that particles are spatially apart and electrically connected in the vicinity of a drive voltage. To make such colored glass, it can be readily prepared by a commonly often used technique, namely, a method in which colorant raw materials such as $AuCl_3$ and $AgNO_3$ are dissolved in main components of the glass, which is then subjected to heat treatment for 10 to 20 minutes at temperatures of from 600° C. to 900° C. to deposit gold colloid or silver colloid fine particles in the glass. In the substrate prepared according to such a commonly available method, the metal fine particles are little deposited out of the glass surface, and therefore have good smoothness of the substrate surface on which the electrodes are formed, thus bringing about the advantage that the electrodes in this device can be made to have a smaller thickness.

In this device, after the metal fine particles were deposited in the glass, the substrate surface may also be treated with an aqueous hydrofluoric acid solution in the same manner as in the device described in relation to the above FIG. 15 so that the metal colloids may be protruded in a large number from the glass substrate surface, thus obtaining the effect as aimed in the present invention.

The present invention further provides an electron-emitting device characterized by a device structure, comprising a semiconductor layer formed between opposing electrodes, and fine particles further arranged in a dispersed state on said semiconductor layer.

In the electron-emitting device of the present invention, application of a voltage between the electrodes brings about emission of electrons from the fine particles which are conductive.

Taking such a device structure not only can solve the problems involved in the prior art previously discussed, but also can provide an electron-emitting device capable of obtaining emitted electric currents with a low electric power and in a high density.

Description will be made below on the basis of FIG. 17.

In the figure, electrodes 1 and 2 are provided on a substrate 4, giving minute spacing to form a discontinuous electron-emitting region comprising fine particles 9 dispersed between them. The numeral 16 denotes a semiconductor layer formed at least at an electrode spacing region L.

Figure 17:
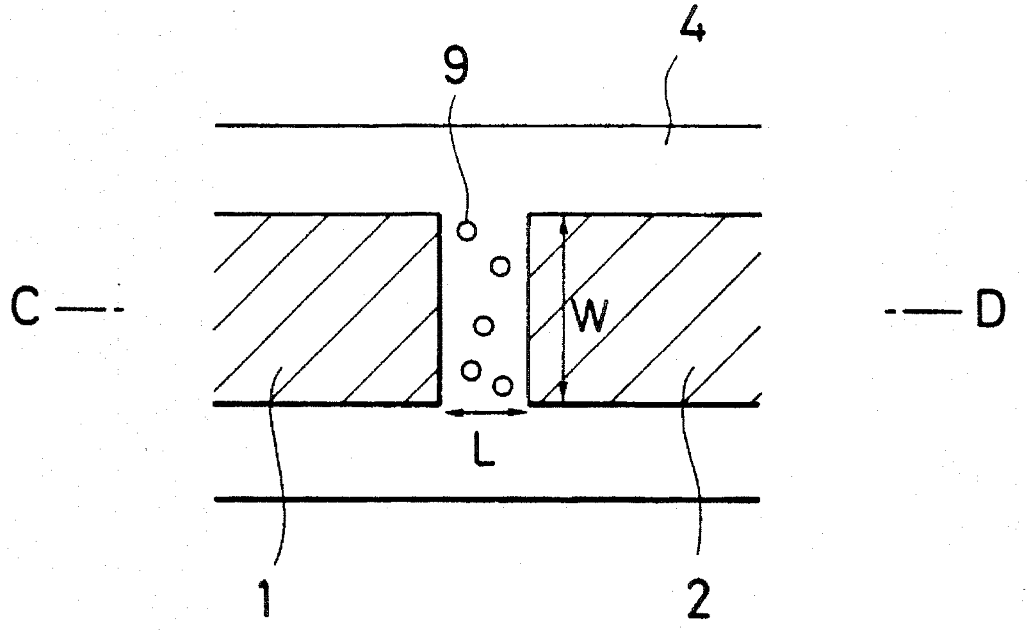
FIGS. 17, 18 19(1), 19(2), 19(3), 20 to 22, 23(1), 23(2), 23(3), 23(4), 24, 25, 26(1), 26(2), 26(3), 26(4), 26(5) and 27 diagrammatically illustrate electron-emitting devices of the present invention having a semiconductor layer comprising fine particles arranged in a dispersed state.
Figure 18:
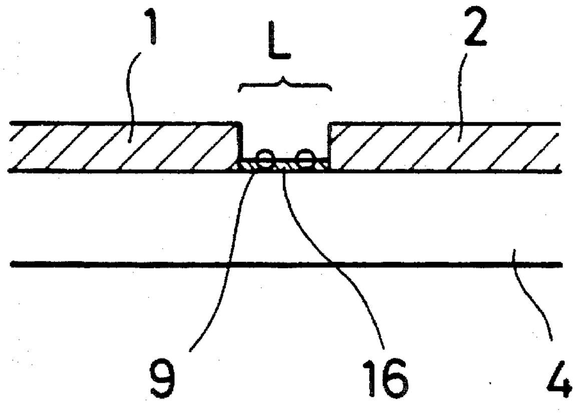

FIG. 18 is a diagrammatical cross section in the C–D direction in FIG. 17. In the figure, the kind, particle diameter and spacing between fine particles on the substrate 4 are as described in relation to FIG. 8.

A method for preparing of the device illustrated in FIG. 17 will be described below.

Figure 19:
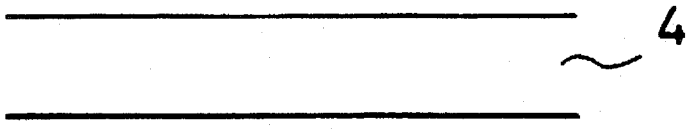
Figure 19:
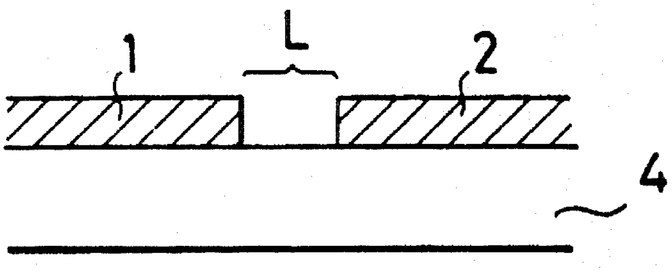
Figure 19:
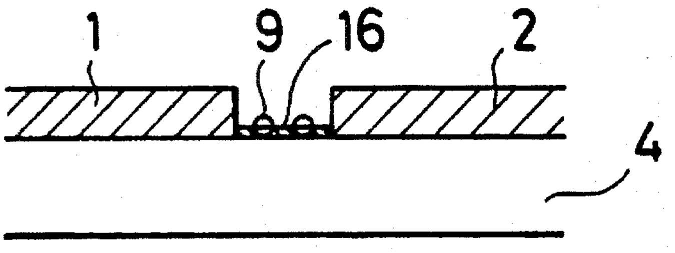

FIG. 19 (1) to (3) illustrate cross sections of a device for each preparation step.

(1) The surface of a substrate 4 comprised of Glass or ceramics is degreased and cleaned.

(2) On the insulating layer obtained in (1), electrodes 1 and 2 are formed according to vacuum deposition, photolithoetching, lifting-off, printing, or the like process.

(3) Next, the fine particles 9 are coated on the electrode gap region obtained in (2). A dispersion of fine particles are used in the coating. Fine particles and an organic binder to promote dispersion of the fine particles are added in an organic solvent comprised of butyl acetate, alcohol, ketone or the like, followed by stirring or the like to prepare the dispersion of fine particles. Usable as the organic binder are butyral resins, acrylic resins, vinyl chloride-vinyl acetate copolymers, phenol resins, nylons, polyesters and urethanes.

Here, an example of methods for preparing the dispersion of the fine particles is set out below.

| | |
|---|---|
| Fine particles, $SnO_2$ (fine particle diameter: 100 to 1,000 angstroms) | 1 g |
| Organic solvent, MEK (methyl ethyl ketone): cyclohexane = 3:1 | 1,000 cc |
| Organic binder, butyral | 1 g |

The above materials were stirred in a paint shaker for three hours glass beads to make a dispersion.

This fine particle dispersion is coated on the surface of a specimen according to dipping, spin coating or the like process, and then baking is carried out for about 10 minutes at a temperature at which the solvent or the like may be evaporated and also the organic binder is carbonized to give a semiconductor layer, for example, at 250° C. Thus the semiconductor layer 16 and the fine particles 9 are arranged in the electrode spacing L. Of course, the semiconductor layer 16 and the fine particles 9 are arranged on the whole surface of the specimen, but no difficulty is brought about as there is applied substantially no voltage to the semiconductor layer 16 and the fine particles 9 outside the electrode spacing L when electrons are emitted. Thickness of the semiconductor layer 16 and arrangement density of the fine particles 9 may vary depending on the coating conditions and how to prepare the fine particle dispersion, and the amount of electric currents flowing to the electrode spacing L may also vary in accordance with this.

In addition to the above formation by coating, also available as a method for dispersing the fine particles 9 to the electrode gap region obtained in (2) is, for example, a method in which a solution of an organic compound is coated on the substrate followed by thermal decomposition to form metal particles. As an example, a solution is prepared using materials shown below:

| | |
|---|---|
| Fine particle materal: Pd organic metal compound (weight calculated as Pd metal) | 3 g |
| Organic solvent: Butyl acetate | 1,000 g |
| Organic binder: Butyral | 1 g |

This Pd organic metal compound solution is coated, followed by heating, so that the fine particles 9 comprising Pd and the semiconductor layer 16 can be obtained.

The semiconductor layer 16 comprises a film mainly constituted of the carbon obtained by the baking. This is a semiconductor layer having an electrical specific resistance of about $1\times10^{-3}$ ohm.cm or more.

In the specimen obtained according to the above steps, the thickness of the semiconductor layer 16 becomes smaller than the particle diameter of the fine particles 9. In other words, it has the structure that the fine particles 9, though embedded in the semiconductor layer 16, are fixed in the manner that they are partly protruded. (FIG. 18)

Figure 20:
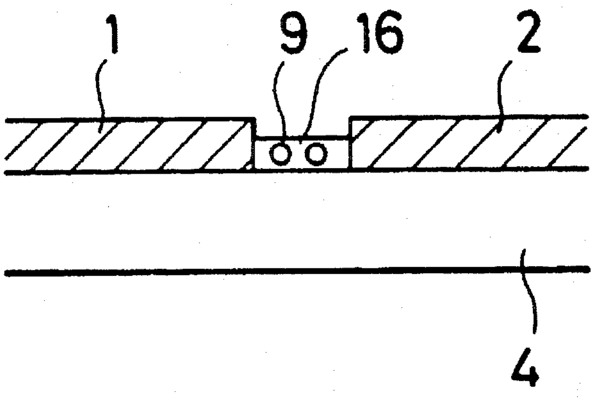

In the embodiment having been described above, the fine particles 9 has the structure that they protrude from the semiconductor layer 16. Here, the fine particles 9 may be covered with a carbon film obtained by further coating only the organic binder solution on the surface of this device followed by baking, so that there can be given the structure that the fine particles 9 are included into the semiconductor layer 16 as illustrated in FIG. 20.

Figure 21:
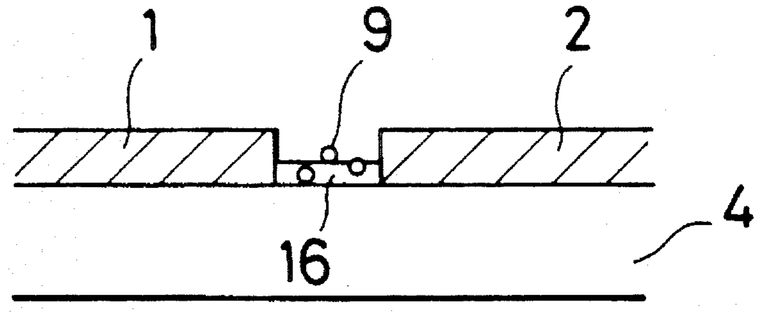

The ratio of carbon to fine particles in the coating solution may be changed to increase the carbon, and also the amount of coating may be increased, so that there can be also given the structure that the fine particles 9 are included into the semiconductor layer 16 or at least part thereof has protruded from the semiconductor layer as illustrated in FIG. 21.

The devices having been described above has the feature that the production steps can be simplified since the semiconductor layer 16 is formed in the same step as for arrangement of the fine particles 9.

It is also possible to prepare the semiconductor layer 16 from materials other than the carbon, namely, semiconductor materials obtained by coating or printing and baking, as exemplified by a solution containing Si, Ge, Se or the like. Accordingly, a semiconductor layer having desired characteristics can be obtained by selecting the conditions for the preparation and coating of the solution of these materials and for the baking. Also in using these semiconductor layers, there is retained the feature that the fine particles can be arranged in the same step.

Figure 22:
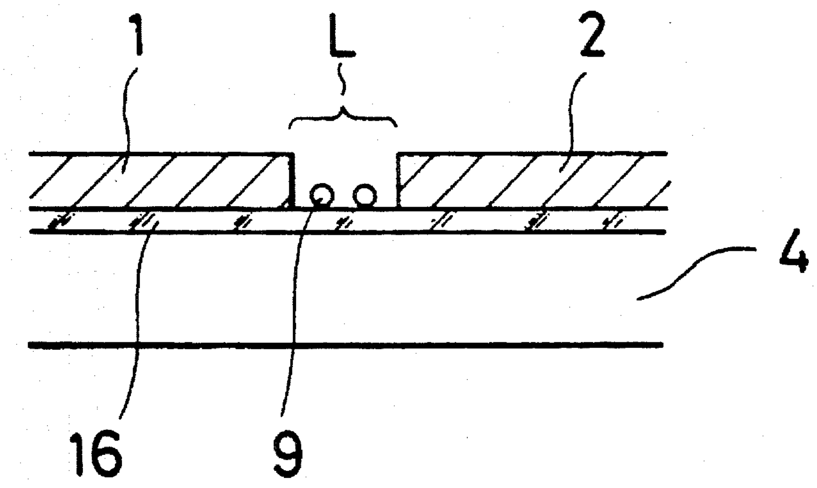

The electron-emitting device of the present invention may also comprise an electron-emitting device having the structure as shown in FIG. 22.

Figure 23:
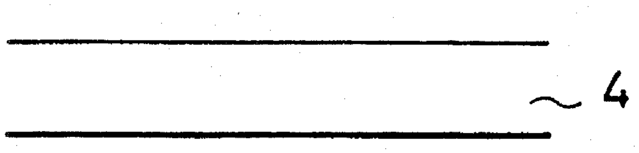
Figure 23:
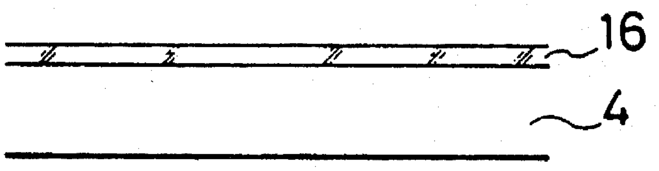
Figure 23:
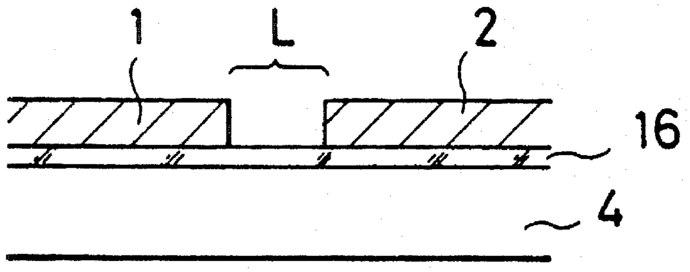
Figure 23:
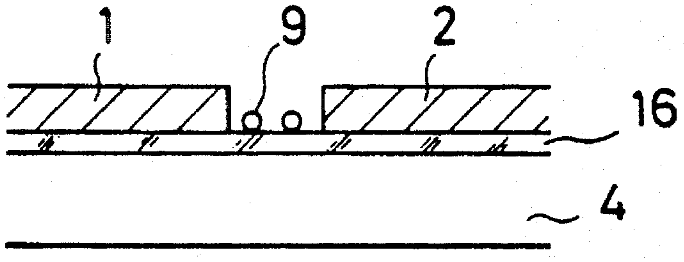

A method of preparing the electron-emitting device illustrated in FIG. 23, 1) to 4) will be described. Cross sections of a device are illustrated in succession to describe below an example of the preparation method.

1) The surface of a substrate 4 is degreased and cleaned.

2) On the substrate obtained in 1), formed is a semiconductor layer 16 obtained by vacuum deposition, coating or printing and baking.

Usable as the above semiconductor layer are an amorphous silicon semiconductor film or crystallized silicon semiconductor film obtained by vacuum deposition, a compound semiconductor film, and a semiconductor film obtained by coating or printing and baking.

For example, there can be formed a hydrogenated amorphous silicon (A-Si:H) semiconductor layer obtained by plasma CVD. This semiconductor layer has a film thickness of approximately from 50 angstroms to 10 μm.

3) Electrodes 1 and 2 are provided in the same manner as in (2) in FIG. 19.

4) Fine particles 9 are provided in the same manner as in (3) in FIG. 19. It is preferred to decrease the amount of carbon in the coating solution or reduce it to zero to make small the thickness of the carbon film semiconductor layer formed at the electrode spacing region L. This is because the effect of the semiconductor layer 16 can be better brought out by allowing an electric current If flowing to the electrode spacing L to flow to the semiconductor layer 16 and the fine particles 9 as much as possible.

In the device having such structure, it is also possible to use fine particles feasible for vacuum deposition. With a material applicable to vacuum deposition, the fine particles can be formed by control of vacuum deposition conditions such as substrate temperature or by a means like vacuum deposition such as masked vacuum deposition.

In the electron-emitting device obtained according to the above 1) to 4), the semiconductor layer and the fine particles are each formed in a separate step, resulting in a greater degree of freedom in the conditions for forming the semiconductor layer. Accordingly, it becomes more possible to adjust characteristics of the semiconductor layer 16. For example, changing the amount of an impurity dope and selecting suitable conditions for formation in forming a semiconductor makes it able to readily adjust the electrical resistance of the semiconductor layer 16. Accordingly, it becomes feasible to adjust the amount of the electric current If flowing to the device, thus bringing about the feature that it becomes feasible to adjust the drive voltage of the device.

Figure 24:
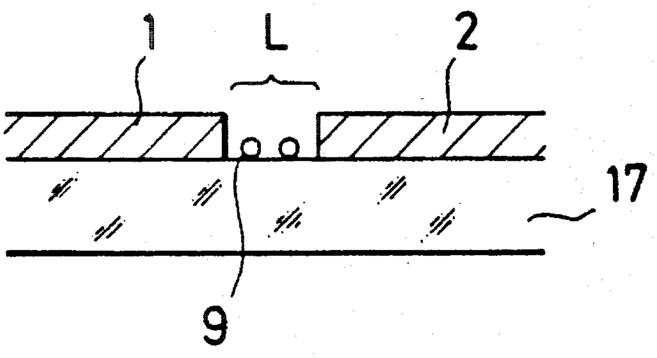

In the electron-emitting device of the present invention, the substrate itself may also comprise a semiconductor substrate that replaces the semiconductor layer 16. FIG. 24 illustrates a cross section of the device of this embodiment. As the semiconductor substrate 17, there can be used substrate materials having desired characteristics, as exemplified by Si wafers. Usable as methods for obtaining the semiconductor substrate having the desired characteristics are ion implantation to a semiconductor substrate or insulator substrate and the like methods.

This method enables adjustment of the specific resistance only at desired areas on the same plane. For this reason, in instances where electron-emitting devices are integrated in a high density, the leakage current among adjacent devices can be made small and the crosstalk can be decreased. Because of the arrangement on the same plane, this method further has the feature that no trouble such as disconnection may occur owing to poorness in step coverage on the stepped ends of the electrodes.

Figure 25:
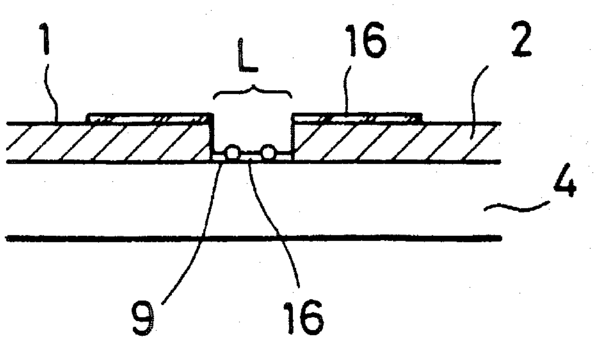

FIG. 25 is a cross section explanatory of still another electron-emitting device of the present invention. The respective materials are constituted in the manner as described above, but in the preparation steps the semiconductor layer 16 is formed after the electrodes 1 and 2 and the fine particles 9 were formed. Thus the fine particles 9 are made to be included into the semiconductor layer 16 and fixed there. The surface of the semiconductor layer is thereafter shaved off by etching to give the structure that the fine particles 9 are fixed in the state that they protrude from the semiconductor layer.

Figure 5:
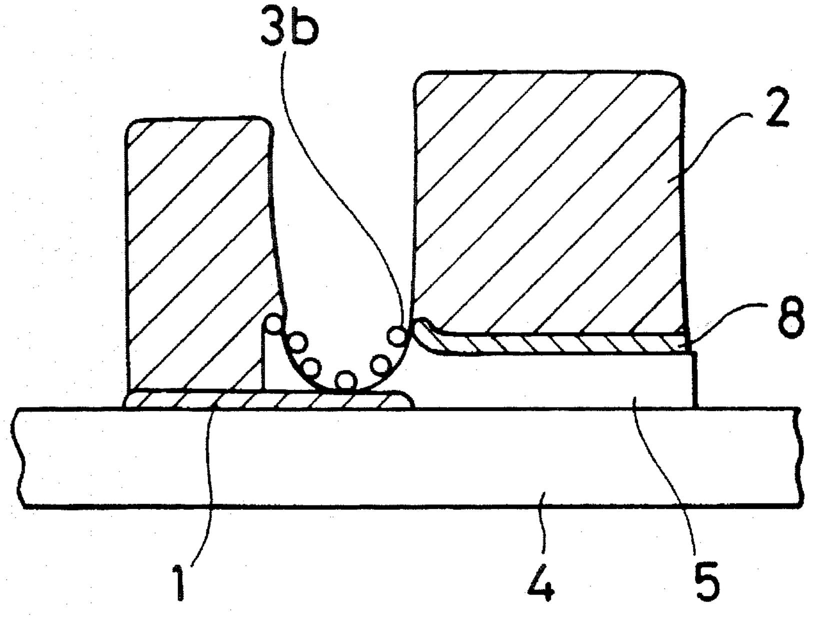
Figure 26:
Figure 26:
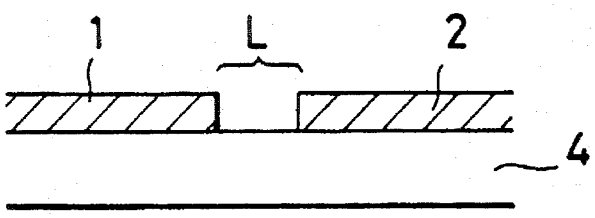
Figure 26:
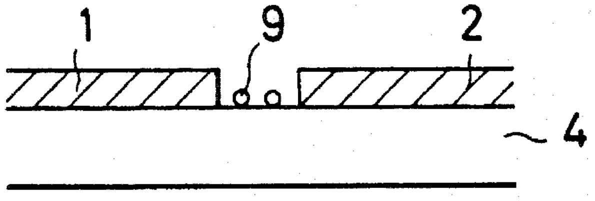
Figure 26:
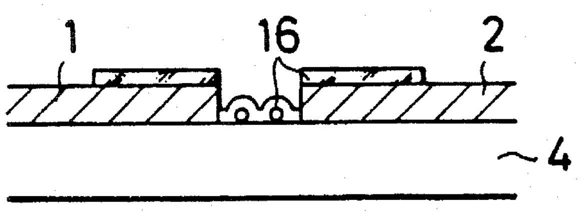
Figure 26:
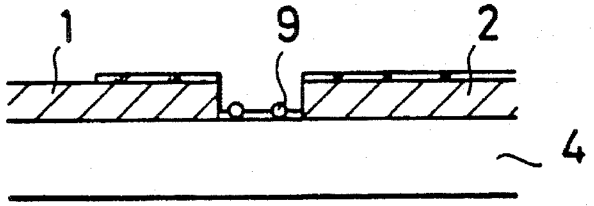

FIG. 26 (1) to (5) successively illustrate cross sections of device to explain the preparation steps of the electron-emitting device illustrated in FIG. 5. An example of the preparation method will be described below.

(1) The surface of the substrate 4 is degreased and washed.

(2) Electrodes 1 and 2 are provided in the same manner as in FIG. 19(2).

(3) Fine particles 9 are provided in the same manner as in FIG. 19(3) (preferably using a dispersion containing no organic binder).

(4) A semiconductor 16 is formed in the vicinity of the electrode spacing region L. Here, in general, the semiconductor layer is deposited also on the surface of the fine particles 9, and so deposited that the particle diameters of the fine particles 9 may produce convexes.

(5) Etching is applied mainly on the surfaces of the convexes of the semiconductor layer 16 obtained in (4). For example, ion milling may be carried out in the state that the specimen is obliquely set, so that the surfaces of the convexes of the semiconductor layer 16 are etched. As a result, there is given the structure that part of each fine particle 9 is exposed from the semiconductor layer 18 at the etched portions and also fixed in the semiconductor layer 16.

If alternatively the etching step is not applied, there is given the structure that the fine particles 9 are included into the semiconductor layer 16.

In all the embodiments having been described above, the semiconductors and fine particles are arranged in the electrode spacing region formed on a plane substrate, but the present invention is by no means limited to these forms.

Figure 27:
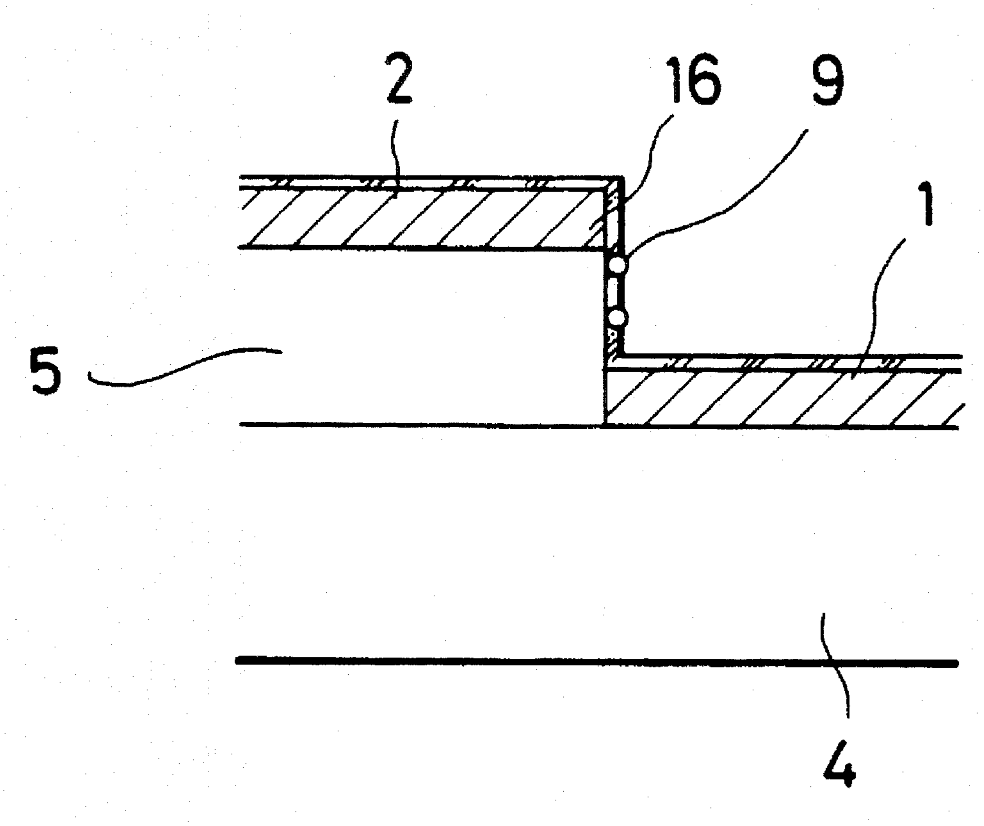

For example, the electron-emitting device may take the form as shown in FIG. 1, i.e., the vertical type one. (See FIG. 27.) This is a device in which the electrodes 1 and 2 are each formed on the other side of a stepped portion of the insulating layer 5 on the substrate 4.

Figure 28A:
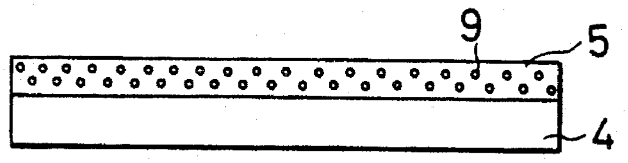
FIGS. 28(*a*), 28(*b*) 28(*c*) 29(*a*), 29(*b*), 29(*c*), 30(*a*), 30(*b*), 30(*c*), 30(*d*), 31, 32(*a*), 32(*b*), 33(*a*), 33(*b*), 33(*c*) 33(*d*), 34(*a*), 34(*b*), 34(*c*), 34(*d*) 35 and 36 diagrammatically illustrate electron-emitting devices according to other embodiments of specific structures of the present invention.
Figure 28B:
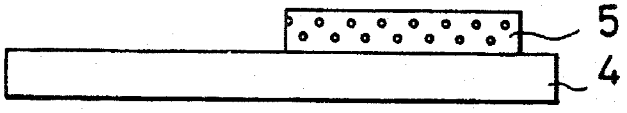
Figure 28C:
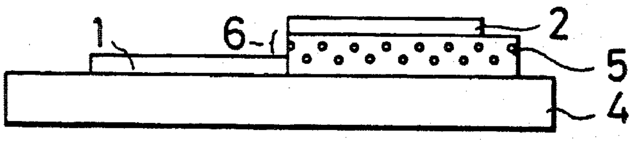

The present invention particularly further provides a device in which the electrodes disposed in the electron-emitting device as illustrated in FIG. 8 are made to be disposed as in the vertical type as shown in FIG. 1, i.e., an electron-emitting device comprising a substrate provided thereon with an insulating layer in which fine particles are dispersed, a stepped portion formed at an end portion of the insulating layer on the top surface of the substrate, and an electrode provided each on the top surface of said insulating layer and on the top surface of said substrate; an end of each electrode being positioned at an upper end or lower end of said stepped portion in such a manner that at least part of the sidewall face at the stepped portion, of the end portion of said insulating layer in which the fine particles are dispersed may not be hidden: and electrode spacing being formed between said electrode ends, where electrons are emitted by applying a voltage between these electrodes [FIG. 28 (C)].

In FIG. 28 (*a*), (*b*) and (*c*), the numerals 1 and 2 denote electrodes for obtaining electrical 5 connection; 4, a substrate: 9, fine particles; 5, an insulating layer containing the fine particles in a dispersed state; and 6, an electrode spacing.

In FIG. 28 (C), the electron-emitting device of the present invention is a device such that the fine particles g dispersed in the insulating layer 5 forming a stepped portion are arranged at the electrode spacing 6 formed between the electrodes 1 and 2 whose end portions oppose each other (but without overlap) at the stepped portion, where electrons are emitted from the fine particles 9 by applying a voltage between the electrodes 1 and 2.

An example of preparation methods will be described below in relation to FIG. 28 (*a*), (*b*) and (*c*).

First, the insulating layer 5 containing the fine particles 9 is built up on the substrate 4 by liquid coating or a like process [see FIG. 28 (*a*)].

Next, the insulating layer 5 is etched by photolithoetching so that a stepped portion is given substantially at the middle portion of the substrate 4 [see FIG. 28 (*b*)].

Then the electrodes 1 and 2 are deposited on the insulating layer 5 and the substrate 4 in such a manner that at least part of the sidewall of the stepped portion may not be hidden, thus forming the electrode spacing 6 [see FIG. 28 (*c*)].

The electron-emitting device of the present invention can be obtained according to the above process. The present device may be placed in a vacuum container, a voltage may be applied to the electrodes 1 and 2, and a lead-out electrode plate (not shown) may be disposed so as to oppose at the top surface of the device, to which a high voltage is applied, whereupon electrons are emitted from the vicinity of the electrode spacing 6.

In this figure, the materials for and thickness of the electrodes, materials for the fine particles concerned with the electron emission and materials for and thickness of the insulating layer are as described in relation to FIG. 1.

Figure 29A:
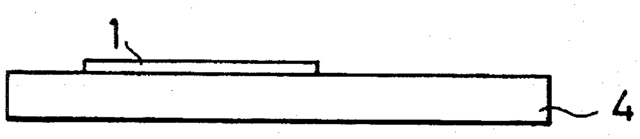
Figure 29B:
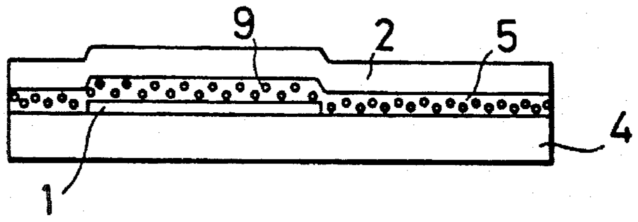
Figure 29C:
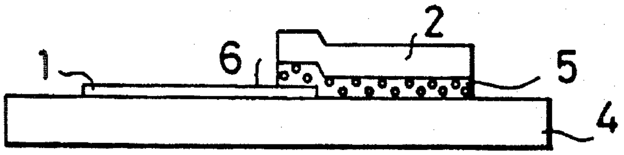
Figure 30A:
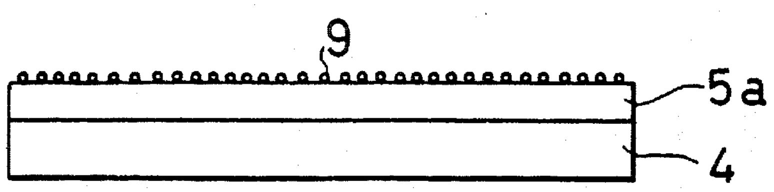
Figure 30B:
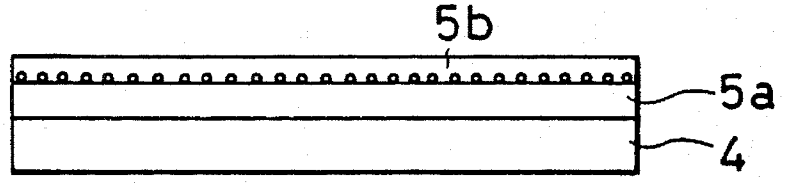
Figure 30C:
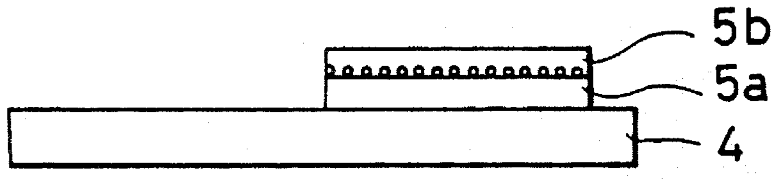
Figure 30D:
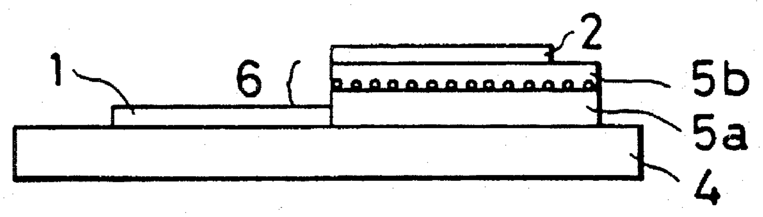

It can be confirm that an electron-emitting device comprising electrodes 1 and 2 formed partly overlapping as illustrated in FIG. 29 (*c*), though having a slight difference in the electrode spacing, can also give good results.

In the device illustrated in FIG. 29 (*c*), an electrode 1 is first deposited and formed on a substrate 4 [see FIG. 29 (*a*)]. Thereafter an insulating layer 5 containing fine particles 9 and an electrode material 2*c* are deposited [see FIG. 29 (*b*)], and an electrode 2 and electrode spacing 6 are formed by photolithoetching, thus forming an electron-emitting device [see FIG. 29 (*c*)].

The present invention also provides an electron emission device as illustrated in FIG. 30, which is another embodiment of the electron-emitting device described in relation to FIG. 28 and at the same time a preferred embodiment of the electron-emitting device illustrated in FIG. 1.

The electron-emitting device illustrated in FIG. 30 comprises a substrate provided thereon with insulating layers interposing the face on which fine particles are dispersed, a stepped portion formed between an end portion of the insulating layer and the top surface of the substrate, and an electrode provided each on the top surface of said insulating layer and on the top surface of said substrate, an end of each electrode being positioned at an upper end lower end of said stepped portion in such a manner that said electrode may not come into contact with the face on which the fine particles are dispersed; and electrode spacing being formed between said electrode ends, where electrons are emitted by applying a voltage between these electrodes.

In FIG. 30, the numeral 1 and 2 denote electrodes for obtaining electrical connection; 4, a substrate; 5*a*, an insulating layer on the substrate 4; 9, fine particles on the insulating layer 5*a*; 5*b*, an insulating layer to cover the fine particles; and 6, electrode spacing between the electrodes 1 and 2.

In FIG. 30(*d*), the electron-emitting device of the present invention is a device in which the fine particles 9 interposed between the insulating layers 5*a* and 5*b* are arranged at the electrode spacing defined between the electrodes 1 and 2 whose end portions oppose each other (but without overlap) at the stepped portion, and electrons are emitted from the fine particles 9 by applying a voltage between the electrodes 1 and 2.

A preparation method thereof will be described below.

First, the insulating layer 5*a* is built up or deposited on the substrate by liquid coating, vacuum deposition or the like process, and then the fine particles 9 are dispersed on the insulating layer 5*a* [see FIG. 30 (*a*)].

Next, the insulating layer 5*b* is built up or deposited on the insulating layer 5*a* and the fine particles 9 by liquid coating or vacuum deposition or the like process so that it may cover the fine particles 9 [see FIG. 30 (*b*)].

The insulating layers 5*a* and 5*b* interposing the fine particles are further formed by photolithoetching so that the stepped portion can be given substantially at the middle of the substrate 4 [see FIG. 30 (*c*)].

Thereafter, the electrodes 1 and 2 are deposited on the insulating layer 5*b* and the substrate 4 in such a manner that at least part of the sidewall of the stepped portion and the fine particles 9 may not be hidden and also no electric short may be caused, to form the electrode spacing 6 [see FIG. 30 (*c*)]

The electron-emitting device of the present invention can be obtained according to the above process. The present device may be placed in a vacuum container, a voltage may be applied to the electrodes 1 and 2, and a lead-out electrode plate (not shown) may be disposed so as to face the top surface of the device, to which a high voltage is applied, whereupon electrons are emitted from the vicinity of the electrode spacing 6.

The present invention may still also be embodied for the electron-emitting region 3 by forming an electron-emitting layer 3*a* and electron-emitting bodies 3*b*.

Figure 31:
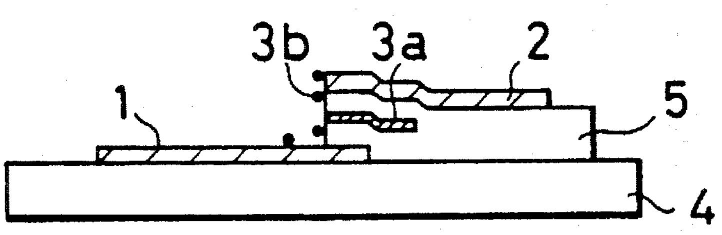

For example, as illustrated also in FIG. 31, this is an electron-emitting device having the structure that, for example, the embodiments of FIG. 3 and FIG. 5 previously described are combined.

In FIG. 31, the electron-emitting device of the present invention is a device comprising a laminate comprising an insulating layer 5 held between a pair of electrodes whose end portions oppose each other, wherein the electron-emitting layer 3*a* is included into the insulating layer 5 in such a manner that the sidewall face of the electron-emitting layer 3*a* may be disposed along the sidewall face of the insulating layer 5 formed at the opposing portion at which the electrodes 1 and 2 oppose each other, and the electron-emitting bodies 3*b* are further disposed at the surface of said sidewall, where electrons are emitted by applying a voltage between the electrodes 1 and 2.

The materials and methods for forming the device are as described previously.

Besides taking the structure as illustrated in FIG. 31 to form the electron-emitting region 3, it is also desirable to, as shown in FIG. 33, form a stepped portion 18 with an insulating layer 5 containing fine particles (electron-emitting materials) 9 and at the same time provide electron-emitting bodies 3*b* on the side surface of said stepped portion.

Figure 35:
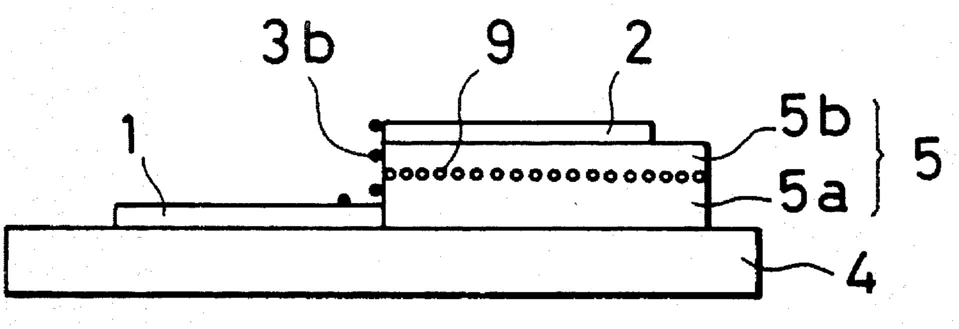

Alternatively, as shown in FIG. 35, fine particles (electron-emitting materials) 9 may be arranged on an insulating layer 5*a*, the fine particles are further covered thereon with an insulating layer 5*b* to form a stepped portion, and electron-emitting bodies 3*b* may be further arranged on the side surface of said stepped portion to form an electron-emitting region.

Figure 36:
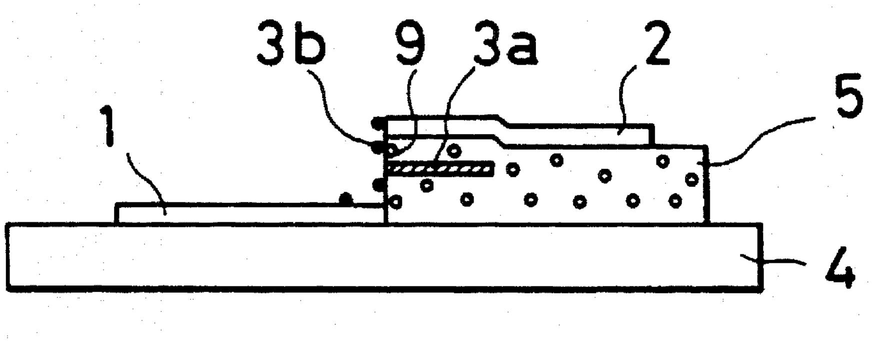

In the present invention, the device may also comprise an electron-emitting region obtained by three or more of its formation methods as shown in FIG. 36.

Incidentally, in the case where the fine particles are used as the electron-emitting bodies 3*b* dispersed on the side surface or the electron-emitting materials 9 contained in the insulating layer as described above, it was confirmed that employment of two or more kinds of different materials as said fine particles enables better control of the characteristics as the electron-emitting device.

Usable as materials for the fine particles are the materials same as those described in relation to FIG. 8. Selecting appropriately two or more kinds of different materials among those materials as occasion demands and using them as the fine particles makes it possible to not only achieve electron emission but also improve or control the characteristics of intended electron-emitting devices.

For example, since in the electron-emitting device of the present invention an electric current in the direction of electrodes is indispensable for electron emission, it is possible to lower the drive voltage of the device by incorporating fine particles of relatively low resistance nature (for example, incorporating Pd or Pt fine particles in $SnO_2$ fine particles).

It can be also expected to increase electron emission by adding to Pd fine particles, low work function materials as exemplified by $LaB_6$ or materials having a large coefficient of secondary electron emission as exemplified by an AgMg alloy.

The present invention can be also effective not only for the embodiment using the fine particles of two or more of different materials, but also for the instance where the fine particles, even though comprised of one kind of materials, are constituted of two or more kinds having difference only in physical parameters such as average particle diameter and shapes.

For example, the particle diameter may be made to comprise two kinds, one of which is so fine (as exemplified by a particle diameter of about 100 angstroms) that the effect of electric field emission can be greatly exhibited, and the other of which is relatively so large (as exemplified by a particle diameter of about 4,000 angstroms) as to be contributory only to electrical conductivity, so that the former can realize increase in the amount of electron emission, and the latter, driving with a low voltage.

It is of course also possible to utilize the materials by making combination both of the above-described two or more kinds of different materials and two or more kinds having difference in physical parameters as in particle diameter.

To form the fine particles by dispersion, most simple and convenient is a method in which a dispersion of fine particles comprising desired materials is coated on a substrate or the like by rotary coating, dipping or the like technique, followed by heating to remove a solvent, a binder and so forth. In this instance, adjusting the particle diameter of fine particles, content thereof, coating conditions, etc, enables control of the state of distribution of their dispersion.

There is no established theory as to the mechanism by which the electrons are emitted from the electron-emitting device according to the present invention, but it is presumed to be nearly as follows:

Presumed are the electric field emission because of the voltage applied to a narrow insulating layer gap, or the secondary electron emission occurring when the electrons emitted from electron-emitting emitting materials are diffracted or scattered by the film of the island-like structure or the electrodes, or caused by collision, or the thermionic emission, hopping electrons, Auger effect, etc.

EXAMPLES

Specific examples of the present invention will be described below.

Example 1

FIG. 3 (*a*), (*b*) is a flow sheet illustrating an example for a method of preparing the electron-emitting device of the present invention.

In FIG. 3 (*a*), (*b*), the numeral 4 denotes a glass substrate; and 1, a nickel electrode of 500 angstroms thick.

$SiO_2$ was vapor deposited to form an insulating layer **5*a* of 1,000 angstroms thick, Au was vapor deposited as an electron-emitting layer 3*a* to have a thickness of 500 angstroms, and an insulating layer 5*b* was also formed in the same manner as for 5*a***, thus bringing these three layers into lamination.

Then these were partly laminated on the electrode 1 as illustrated in FIG. 3 (*a*), along the pattern of the electrode 1, followed by patterning. Next, Ni was laminated as an electrode 2 with a film thickness of 5,000 angstroms.

As illustrated in FIG. 3 (*b*), the electrode 2 was subjected to patterning by usual photolithographic process along the patterns of the electrode 1, insulating layer **5*a*, electron-emitting layer 3*a* and insulating layer 5*b*. As illustrated in the figure, the electrodes 2*a* and 2*b* were electrically separated, and here the area at which the electrode 2*b* and electrode 1** overlap was made as small as possible.

Applying a voltage of 20 V between the electrode **2*a* and 2*b*, there was obtained emission of an electron beam 7 of 0.3 μA per 1 mm length of width of the electrode 2*a*** in the direction vertical to the paper surface.

As to the electron-emitting layer **3*a*, usually it may show an island structure similar to the small island structure among narrow cracks in the conventional film prepared by forming, if its film thickness is 100 angstroms or less. However, it is presumed that even if the film thickness increases to give a continuous film, the electrodes 1 and 2*b*** are electrically insulated, and thus the layer acts similarly to the island structure.

Example 2

In FIG. 4, the numerals 1 to 5 denotes the same as in FIG. 3. In this figure, the numeral 8 denotes an intermediate layer, which is interposed between the insulating layer **5*b* and electrode 2 to constitute a multi-layer electrode. In the present Example, subsequent to the formation of the insulating layer 5*b*, a step to vapor-deposit $LaB_6$ to a thickness of 1,000 angstroms followed by patterning was added to the preparation steps in Example 1. The electrode 2** was also formed by using Ni with a thickness of 5,000 angstroms as in Example 1.

Applying a voltage of 20 V between the electrode **2*a* and 2*b* of the device thus obtained, there was obtained emission of an electron beam 7 of 0.5 μA per 1 mm length of width of the electrode 2*a*** in the direction vertical to the paper surface.

Example 3

Figure 6A:
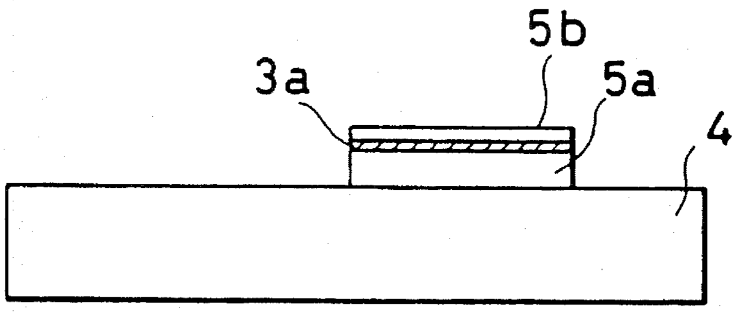
Figure 6B:
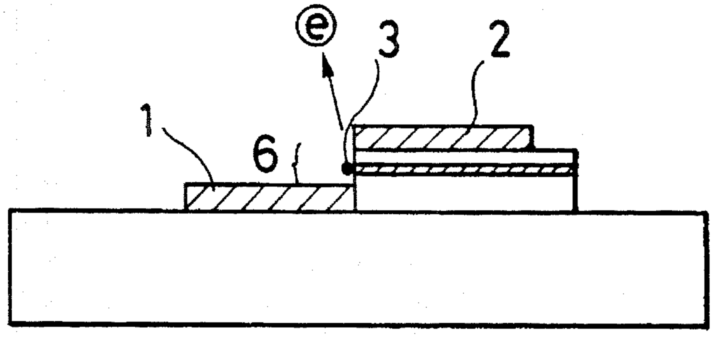

FIG. 6 (*a*), (*b*) is a flow sheet illustrating an example for a method of preparing the electron-emitting device according to the second embodiment of the present invention. In FIG. 6 (*a*), (*b*), the numeral 4 denotes a glass substrate.

An insulating layer **5*a* was formed with $SiO_2$ in 1,500 angstrom thickness; an electron-emitting layer 3*a*, with Pd in 250 angstrom thickness; and an insulating layer 5*b*, with $SiO_2$ in 500 angstrom thickness, each of which layer was obtained by vacuum deposition and thereafter, as illustrated in FIG. 6** (*a*), etched to have a stepped shape to effect patterning. Next, electrodes 1 and 2 are deposited. The electrodes are, as illustrated in FIG. 6 (*b*), are deposited on the insulating layer **5*a* and 5*b* and the stepped portion formed by the electron-emitting layer a with use of Ni with a thickness of 1,000 angstroms. In this occasion, generally the electrode 1 will not come into contact with the electron-emitting layer 3 if the thickness of the electrode is made smaller than the height of the stepped portion of the insulating layer 5***a*, i.e., the step coverage is made poor, and also the electrode spacing 6 can be made narrower if the insulating layer 5*b* is made thinner.

The electron-emitting device obtained according to the above process was placed in vacuum, a voltage of 1 kV was applied using a lead-out electrode (not shown) provided at an upper area in the drawing, and a direct current voltage of about 12 V was applied between the electrodes 1 and 2, resulting in emission of electrons from the electron-emitting region 3.

Example 4

(See FIG. 2.) On a glass substrate 4, an insulating layer 5 was deposited using $SiO_2$ to a thickness of 2,000 angstroms. This was etched to have a stepped shape to effect patterning. Next, electrodes 1 and 2 were deposited with Ni in 1,000 angstroms thickness by vacuum deposition with masking to desired shapes. Here, the step coverage by vapor deposited Ni at the stepped portion was generally made poor, and the electrode spacing 6 was formed in a space of about 1,000 angstroms. Fine particles were made to be fixed here as electron-emitting bodies 3*b*. The fine particles are obtained, for example, by the following manner. Namely, prepared is a solution of fine particles of metals such as Pd, having a particle diameter of several 100 angstroms as materials serving as the electron-emitting bodies 3*b*. This solution was coated by spin coating, and baked at a temperature of about 300° C. to fix the fine particles to the electrode spacing region. The resulting device was able to emit electrons by driving it as in Example 3.

Example 5

In the constitution in FIG. 8, formed on a soda lime glass substrate 4 was an insulating layer 11 comprised of a lead oxide type low-melting glass coating film.

Pt electrodes 1 and 2 were further formed thereon with a thickness of 1,000 angstroms, L=0.5 μm and W=300 μm, and Pd, as fine particles 9, of several hundred angstroms in particle diameter were further arranged in a dispersed state between said electrodes.

The Pd fine particles 9 were arranged by spin coating (3,000 rpm; coating was repeated five times), using a butyl acetate solution (Catapaste CCP-4230, available from Okuno Seiyaku Kogyo) containing an organic palladium compound in an amount of about 0.3% in terms of Pd metal, and treated by heating at 250° C. They were then baked for 20-minutes at 450° C. to bring the fine particles to be included into the insulating layer 11.

Here, the amount of an electric current flowing to the electrode spacing L was about 5 μA/5 V. This specimen was subjected to pickling using an aqueous 5 to 10 vol. % HCl solution, resulting in the amount of electric current of 250 μA/5 V.

The specimen prepared according to the above process was placed under vacuum of $10^{-5}$ Torr or more, and a voltage was applied between the electrodes 1 and 2 as described above. As a result, an electric current $V_f$ flowed on the surface of inside of the insulating layer 11 or through the fine particles 9, and a stable electron emission was confirmed when a voltage was applied allowing an lead-out electrode (not shown) to serve as the anode. The electron emission was also confirmed in regard to a specimen to which no pickling was applied.

Results of measurement on the electron-emitting device prepared in the present Example are shown in Table 1. Swing of the emitted electric current is indicated with a value obtained by dividing the amount of change $\Delta I_e$ in the amount of the emitted electric current of $1\times10^{-3}$ Hz of less by the emitted electric current $I_e$ and multiplying it by 100, i.e., $\Delta I_e/I_e\times100$.

TABLE I

| $V_f$ Device drive voltage | $I_e$ Emitted current | Efficiency (Emitted current $I_e$/Device current $I_f$) | Life* | Swing of emitted current |
|---|---|---|---|---|
| Present Example: 30 V | 0.8 μA | $8\times10^{-3}$ | 100 hrs or more | 10% |

*Life: The period in which the emitted electric current comes to 50% or less

The above results, as compared with the results of measurement of a surface conduction electron-emitting device comprised of ITO materials that required the forming the conventional technique (drive voltage of the device: 20 V; emitted electric current: 1.2 μA; efficiency: $5\times10^{-3}$ life: 35 hours; swing of emitted electric current: 20 to 60%), can tell the following:

The electron-emitting device of the present Example is stable and of long life, and shows high characteristics in the electron-emitting efficiency.

Example 6

Example 5 was exactly repeated except that the baking for 20 minutes at 450° C. was replaced by complete baking for 2 hours at 490° C., to carry out an experiment.

The device obtained by the above experiment gives a device in which all the fine particles 9 are penetrated into the insulating layer 11 (FIG. 9).

The same measurement as in Example 5 was made on this electron-emitting device to obtain the same electron emission as in Example 5, but it tended to have a longer life and show further decreased swing of the emitted electric current.

More specifically, the electron-emitting device in which the fine particles are included into the insulating layer as in the present Example 6 is characterized by being more improved in the life and the swing of emitted electric current in addition to the effect obtainable in Example 5.

Example 7

Example 5 was exactly repeated except that the baking for 20 minutes at 450° C. was replaced by baking for 10 minutes at 420° C.

The device obtained by the above experiment gives a device as shown in FIG. 10. The electron-emitting device in which the fine particles are slightly penetrated into the insulating layer brought about an electron-emitting device having more improved emitted electric current and emitted current efficiency ($I_e/I_f$) in addition to the effect obtainable in Example 4.

Example 8

The surface of the insulating layer 11 at the electrode spacing L of the electron-emitting device obtained in Example 6 was etched using an aqueous 5 Vol.% Hf solution to bring the fine particles 9 to expose from the insulating layer 11, so that there was obtained a device having the same structure as in the above Example 7.

Example 9

Using a substrate 12 comprising porous glass having a pore size of 80 to 1,000 angstroms in which gold fine particles were deposited to have a device resistance of from 1 megaohm to 10 megaohms, there was given an electron-emitting device of the present invention (FIG. 9).

Measurement on said device was carried out in the same manner as in Example 5. Results are shown in Table 2.

TABLE 2

| $V_f$ Device drive voltage | $I_e$ Emitted current | Efficiency (Emitted current $I_e$/Device current $I_f$) | Life* |
|---|---|---|---|
| Present Example: 25 V | 1.0 μA | $2 \times 10^{-3}$ | 1,000 hrs or more |

*Life: The period in which the emitted electric current comes to 50% or less.

It was revealed from the above results that the electron-emitting device of the present invention becomes an electron-emitting device that is stable (i.e. small in the swing of the emitted electric current) and of long life and has a high electron emission efficiency as compared with a conventional device obtained by forming of Gold (device drive voltage of: 16 V; emitted current: 0.8 μA; efficiency: 1.2×10; life: 35 hours; swing: 20 to 60%). After the experiment for electron emission, the degree of device deterioration was observed by using a scanning type electron microscope, but there was seen little change in the diameter or distribution of the fine particles of Gold present between the electrodes. However, the device obtained by forming of gold showed an extreme deterioration at the high resistance part discussed in the prior art.

The device according to the present Example 9 was able to be readily intergrated with less irregularities between devices even when a number of the devices were formed on the same substrate.

Example 10

Referring to FIG. 16, obtained was an electron-emitting device comprising a colored glass (golden red glass) substrate 14 having Gold colloids.

The same measurement as in Example 5 was made on said electron-emitting device. Results obtained are shown in Table 3.

TABLE 3

| $V_f$ Device drive voltage | $I_e$ Emitted current | Efficiency (Emitted current $I_e$/Device current $I_f$) | Life* |
|---|---|---|---|
| Present Example: 32 V | 0.6 μA | $2 \times 10^{-2}$ | 2,000 hrs or more |

*Life: The period in which the emitted electric current comes to 50% or less.

As will be seen also from Table 3, the electron-emitting device of the present Example is stable (i.e. small in the swing of the emitted electric current) and of long life and has a high electron emission efficiency. After the experiment for electron emission, the degree of device deterioration was also confirmed by using a scanning type electron microscope, but there was seen little change in the diameter or distribution of the fine particles of gold present between the electrodes. In contrast therewith, the conventional device obtained by forming of ITO shows an extreme deterioration at the high resistance part.

There was also obtained similar results in the case when, after fine particles are deposited in the glass, the substrate surface was treated with an aqueous hydrofluoric acid solution so that metal colloids may be protruded in a large number from the surface of the glass substrate, thus giving an electron-emitting device of the present invention.

Example 11

On a clean, quartz glass substrate of about 1 mm thick, a solution prepared by mixing an organic solvent (Catapaste CCP, available from Okuno Seiyaku Kogyo) containing an organic palladium compound with a $SiC_2$ liquid coating preparation (OCD, available from Tokyo Ohka Kogyo) to have a molar ratio of $SiC_2$:Pd of about 5:1 was spin-coated with a spinner. Thereafter the resulting coating was baked for 1 hour at about 400° C. to obtain a $SiO_2$ insulating layer 11 having a film thickness of about 1,000 angstroms and containing Pd fine particles 9. After this step, the surface of the insulating layer 11 was etched using an aqueous hydrofluoric acid to bring the fine particles 9 to protrude from the insulating layer 11.

Next, on the $SiC_2$ insulating layer 11, a photoresist was formed by photolithography with a thickness of abut 0.8 μm in the shape giving an electrode spacing L. Further on the $SiO_2$ insulating layer 11 and said photoresist, a Ni thin film was deposited with a thickness of 1,000 angstroms according to the masking EB vacuum deposition that obtains shapes of electrodes. Thereafter the photoresist was peeled to carry out a lift-off step to remove unnecessary Ni thin film on the photoresist. Thus the shapes of the electrodes 1 and 2 and electrode spacing L as shown in FIG. 8 can be formed. In this instance, each dimension shown in FIG. 8 was set to be L=0.μ um, W=300 μm and A=2 mm.

Electron emission characteristics of the electron-emitting device obtained according to the above process were measured to have revealed that there was obtained electron emission of, approximately, emitted electric current $I_e$=1 μA and emission efficiency $\alpha=5\times10^{-3}$ under the drive voltage Vf=30 V of the device. The life and the swing of the emitted electric current were in substantially the same level as those in Example 5.

Example 12

Example 11 was repeated but replacing the organic palladium compound by $SnO_2$ fine particles of 100 angstroms in average particle diameter, to obtain a similar electron-emitting device, and similar experiments were carried out. As a result there was obtained electron emission of substantially the same level as in Example 11.

Example 13

In the constitution as illustrated in FIG. 17, a semiconductor layer 16 of about 100 angstroms thick was formed on a soda glass substrate 4 by using a carbon film obtained from a calcined organic substance. Palladium fine particles of about 100 angstroms in diameter are dispersed in the semiconductor layer.

Electrodes 1 and 2 were also formed with Pt to have a thickness of 1,000 angstroms, a spacing of 0.8 μm, and a width of 300 μm.

Applying a voltage between the electrodes and 2 prepared in the above produced a flow of an electric current $I_f$ through the semiconductor layer and fine particles 19, and a stable electron emission was confirmed when a voltage was applied allowing an lead-out electrode to serve as the anode.

Comparison of examples of characteristics were made between the electron-emitting device prepared in the present Example, having a semiconductor, and a prior art surface conduction electron-emitting device comprised of ITO and requiring the forming, to obtain the results shown in Table 4. Swing of the emitted electric current is indicated with a value obtained by dividing the amount of change $\Delta I_e$ in the amount of the emitted electric current of $1\times10^{-3}$ Hz or less by the emitted electric current I and multiplying it by 100, i.e., $\Delta I_e/I_e\times100$ (%).

TABLE 4

| $V_f$ Device drive voltage | $I_e$ Emitted current | Efficiency (Emitted current $I_e$/Device current $I_f$) | Life* | Swing of emitted current |
|---|---|---|---|---|
| Present Example: 15 V | 4 μA | $1\times10^{-3}$ | 800 hrs or more | 15% |
| Device of forming of ITO: 20 V | 1.2 μA | $5\times10^{-3}$ | 35 hrs | 20–60% |

*Life: The period in which the emitted electric current comes to 50% or less

As will be clear from Table 4, the surface conduction electron-emitting device of the present Example is characterized by being stable and of long life, showing a low drive voltage and a large emitted electric current.

Example 14

In the constitution illustrated in FIG. 22, an A-Si:H film was deposited on a glass substrate 4 by plasma CVD to have a thickness of 2,000 angstroms, thus giving a semiconductor layer 16. Electrodes 1 and 2 were formed with Pt to have a thickness of 1,000 angstroms, a spacing L of 0.8 μm, and a width W of 300 μm.

Pd, as fine particles 9, of several 100 angstroms in diameter were further arranged in a dispersed state between said electrodes.

The Pd fine particles 9 were arranged by spin coating (3,000 rpm; coating was repeated five times), using a butyl acetate solution (Catapaste CCP-4230, available from Okuno Seiyaku Kogyo) containing an organic palladium compound in an amount of about 0.3% in terms of Pd metal, and treated by heating at 250° C. The electron-emitting device prepared in the present Example, having a semiconductor, was evaluated in the same manner as in Example 13. As a result, it was able to obtain similar electron emission.

Example 15

In the constitution illustrated in FIG. 25, electrodes 1 and 2 were formed on a glass substrate 4 with Pt to have a thickness of 1,000 angstroms, a spacing L of 0.8 μm, a width W of 100 μm.

Fine particles were prepared in the same manner as in Example 14, and hydrogenated amorphous silicon was formed as a semiconductor layer 16 by plasma CVD to have a thickness of about 500 angstroms.

Thereafter the convexes on the semiconductor layer 16 were etched by ion milling.

The electron-emitting device prepared according to the above process was evaluated in the same manner as in Example 12 to have found that there is obtained similar electron emission. Particularly in the present Example, different from Example 14, the electron-emitting device in which the fine particles 9 were fixed in the semiconductor layer 16 had a tendency of stableness in electron emission in addition to the effect obtainable in Example 14.

Example 16

An electron-emitting device was obtained according to the previously described preparation steps (*a*) to (*c*) of FIG. 28.

More specifically, on a clean, quartz glass substrate of about 1 mm thick, a solution prepared by mixing an organic solvent (Catapaste CCP, available from Okuno Seiyaku Kogyo) containing an organic palladium compound with a $SiO_2$ liquid coating preparation (OCD, available from Tokyo Ohka Kogyo) to have a molar ratio of SiO:Pd of about 5:1 was spin coated with a spinner. Thereafter the resulting coating was baked for 1 hour at about 400° C. to obtain a $SiO_2$ insulating layer 5 having a film thickness of about 1,500 angstroms and containing Pd fine particles 9 [see FIG. 28 (*a*)].

Next, the insulating layer 5 was etched by photolithoetching with use of an aqueous hydrofluoric acid solution to form a stepped portion of about 1,500 angstroms high at the middle of the substrate 4 [see FIG. 28 (*b*)].

Thereafter, Ni electrodes 1 and 2 of about 500 angstroms in film thickness was formed by deposition utilizing EB vacuum deposition in the manner that the stepped portion may not be completely covered.

In this instance, there is given the structure that the electrodes 1 and 2 oppose each other with certain spacing, across the side wall of the stepped portion of the insulating layer 5 containing the fine particles 9. This space is designated as electrode spacing 6 [see FIG. 28 (*c*)].

Electron emission characteristics of the electron-emitting device obtained according to the above process were measured to have revealed that there was obtained electron emission of, approximately, emitted electric current $I_e$=2.5 μA and emission efficiency $\alpha=5\times10^{-3}$.

Example 17

According to the previously described preparation steps (*a*) to (*c*) of FIG. 29, prepared was an electron-emitting device of the constitution that an insulating layer is held between electrodes.

More specifically, on a clean, quartz glass substrate 4 of about 1 mm thick, an Ni electrode of about 500 angstroms in film thickness was deposited by EB vacuum deposition to form an electrode 1 by photolithoetching [see FIG. 29 (*a*)].

Next, on the surface of the electrode I and the substrate 4, a $SiO_2$ insulating layer 5 containing Pd fine particles 9 was deposited in the same manner as in Example 16 to have a film thickness of about 1,000 angstroms. A Ni thin film of about 1,000 angstroms in film thickness was further deposited on the $SiO_2$ insulating layer to give an electrode material 2*c* [see FIG. 29 (*b*)].

Thereafter, on the Ni thin film, formed was a photoresist in the shape of an electrode 2 partly overlapping with the electrode 1 at the middle of the substrate. In the shape of this photoresist, the electrode material 2*c* and insulating layer 5 were etched, followed by peeling of the resist to form the electrode 2 and an electrode spacing 6. The size other than thickness, of each material, was made to be the same as in Example 16.

Electron emission characteristics of the electron-emitting device obtained according to the above process were measured. As a result, there was obtained the same electron emission as in Example 16.

Example 18

Example 16 was repeated except that the material for fine particles and the organic solvent comprising the organic metal compound were replaced by a $SiO_2$ liquid coating preparation in which $SnO_2$ fine particles of about 100 angstroms in primary particle diameter were dispersed, to carry out an experiment. As a result, there was obtained the same electron emission as in Example 16.

Example 19

An electron-emitting device was obtained according to the previously described preparation steps (*a*) to (*d*) of FIG. 30.

More specifically, on a clean, quartz glass substrate of about 1 mm thick, a $SiO_2$ liquid coating preparation (Catapaste CCP, available from Okuno Seiyaku Kogyo) was spin-coated with a spinner. Thereafter the coating was baked for 1 hour at about 400° C. to obtain an insulating layer 5*a* comprised of $SiO_2$ and having a film thickness of about 1,000 angstroms. Subsequently, on the insulating layer 5*a*, an organic solvent (Catapaste CCP, available from Okuno Seiyaku Kogyo) containing an organic palladium compound was spin coated with a spinner. Thereafter the coating was baked for 10 minutes at about 250° C. to obtain fine particles 9 comprised Of Pd in the state that they are dispersed on the surface of the insulating layer 5*a* [see FIG. 30 (*a*)].

Next, on the fine particles 9 and insulating layer 5*a*, an insulating layer 5*b* comprised of $SiO_2$ was coated in the same manner as the insulating layer 5*a* to have a film thickness of about 500 angstroms, followed by baking [see FIG. 30 (*b*)].

Thereafter, the insulating layers 5*a* and 5*b* were etched using an aqueous hydrofluoric acid solution by photolitho-etching to form a stepped portion of about 1,500 angstroms high at the middle of the substrate 4 [see FIG. 30 (*c*)].

Ni electrodes 1 and 2 of about 5,000 angstroms in film thickness was further formed by deposition utilizing EB vacuum deposition in the manner that the stepped portion may not be completely covered. A space thus formed is designated as electrode spacing 6 [see FIG. 30 (*d*)].

Electron emission characteristics of the electron-emitting device obtained according to the above process were measured to have revealed that there was obtained electron emission of, approximately, emitted electric current $I_e$=2.0 μA and emission efficiency $\alpha=8\times10^{-3}$.

Example 20

Figure 32A:
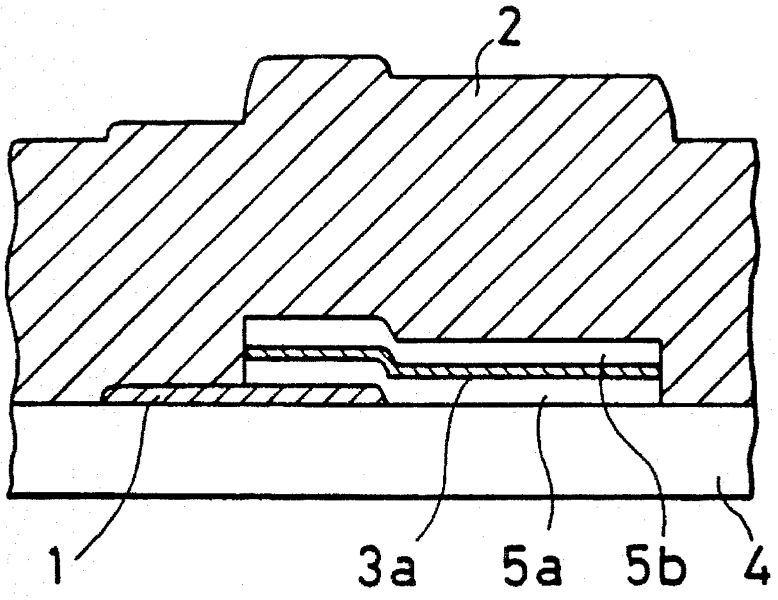
Figure 32B:
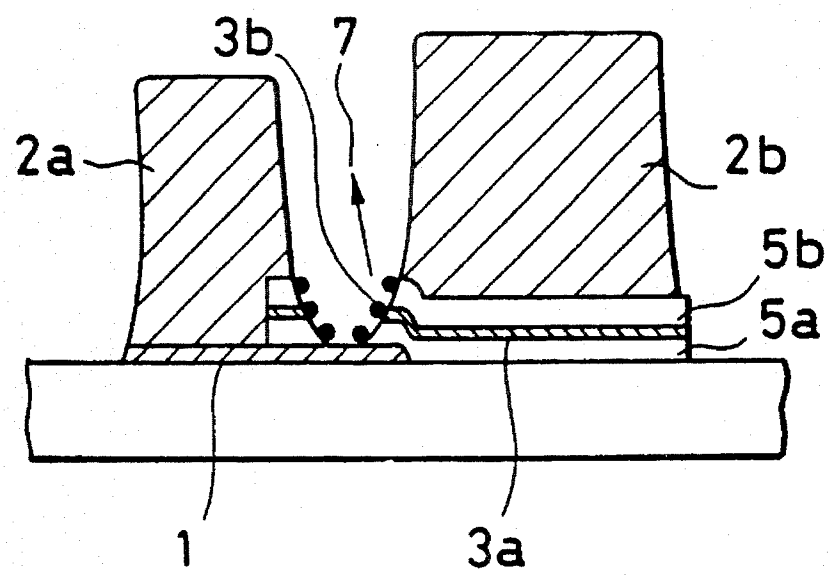
Figure 33A:
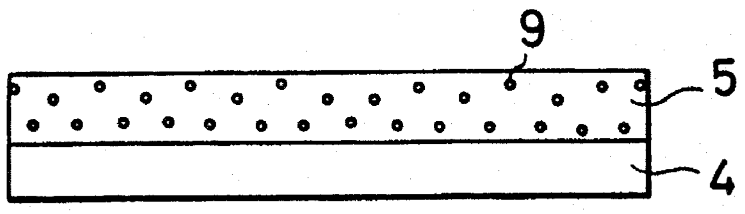
Figure 33B:
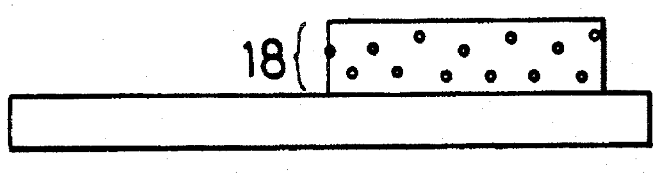
Figure 33C:
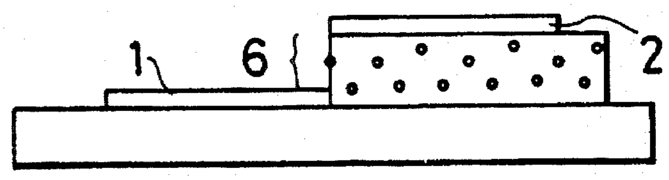
Figure 33D:
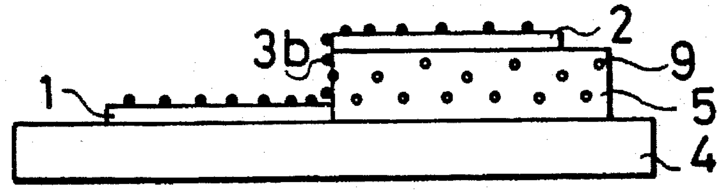
Figure 34A:
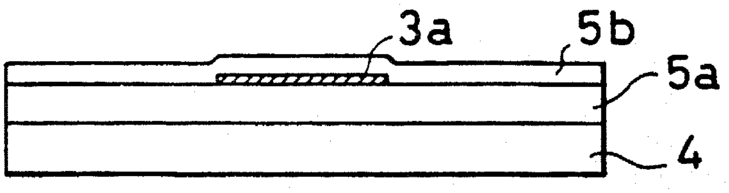
Figure 34B:
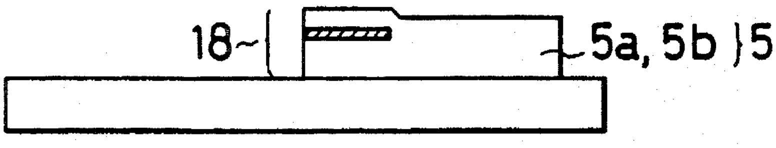
Figure 34C:
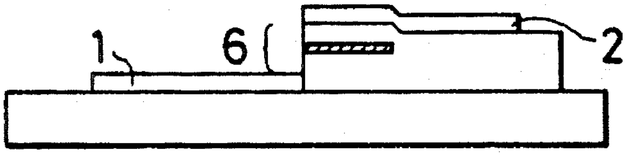
Figure 34D:
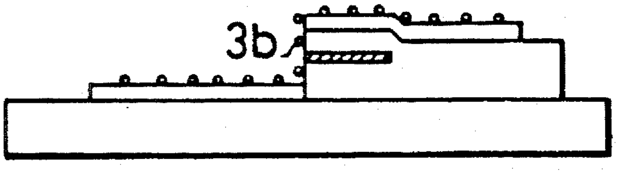

As illustrated in FIG. 32, a Ni electrode 1 of 500 angstroms thick was formed on a glass substrate 4 by vacuum deposition. On the electrode 1, an insulating layer 5*a* made of $SiO_2$ was formed by vacuum deposition utilizing sputtering to have a film thickness of 1,000 angstroms.

Next, an electron-emitting layer made of Au was formed in 500 angstroms thickness by vacuum deposition (a layer 3*a*), and thereafter an insulating layer 5*b* ($SiO_2$) was formed with a film thickness of 1,000 angstroms by sputtering.

After the respective layers of the insulating layer 5*a*, electron-emitting layer 3*a* and insulating layer 5*b* were laminated, they are partly laminated on the electrode 1 as illustrated in FIG. 32 (*a*) along the pattern of the electrode 1, followed by patterning. Next, an electrode 2 is laminated. The electrode 2 was made of Ni to make wiring resistance lower. The thickness thereof was controlled to 5,000 angstroms to obtain necessary wiring resistance.

After the electrode 2 was laminated by vacuum deposition, the electrode 2 was subjected to patterning by, for example, usual photolithographic process along the patterns of the electrode 1, insulating layer 5*a*, electron-emitting layer 3*a* and insulating layer 5*b* as illustrated in FIG. 32 (*b*).

A Pd organic metal solution (Catapaste, available from Okuno Seiyaku Kogyo Co. ) was spin coated as an electron-emitting layer, followed by baking for 10 minutes at 250° C. to provide electron-emitting bodies on the surface of a side wall of the insulating layers. A voltage of 14 V was applied between the electrodes 2*a* and 2*b* using a lead-out electrode (not shown) provided above the device substrate, and a lead-out voltage of 500 V was applied to obtain emission of electron beams 7 of 1.7 μA.

Example 21

FIG. 33 (*d*) illustrate a cross section of a electron-emitting device obtained in the present Example [See FIG. 33 (*a*) to (*d*) as to the preparation steps].

On a clean, quartz glass substrate 4 of about 1 mm thick, a solution prepared by mixing an organic palladium compound solution (Catapaste CCP, available from Okuno Seiyaku Kogyo) with a $SiO_2$ liquid coating preparation (OCD, available from Tokyo Ohka Kogyo) to have a molar ratio of SiO:Pd of about 10:1 was spin coated with a spinner. Thereafter the resulting coating was baked for 1 hour at about 400° C. to obtain a $SiO_2$ insulating layer 5 having a film thickness of about 3,500 angstroms and containing electron-emitting materials 9 (Pd fine particles) [see FIG. 33 (*a*)].

Next, the insulating layer 5 was etched by photolithoetching with use of an aqueous hydrofluoric acid solution to form a stepped portion 18 of about 3,500 angstroms high at the middle of the substrate 4 [see FIG. 33 (*b*)].

Thereafter, Ni electrodes 1 and 2 of about 500 angstroms in film thickness was formed by deposition utilizing EB vacuum deposition to have the shape illustrated in FIG. 33 (*c*) in the manner that the stepped portion may not be completely covered.

Electron emitting bodies 3*b* were further provided on the surface of a side wall of the insulating layer in the same manner as in Example 19 [see FIG. 33 (*d*)].

Electron emission characteristics of the electron-emitting device obtained according to the above process were measured to have revealed that there was obtained electron emission of, approximately, emitted electric current $I_e$=4 μA and emission efficiency α=2×10, under applied device voltage $V_f$=14 V and lead-out voltage $V_a$=1 kV.

Example 22

Example 21 was repeated except that the organic metal compound solution that formed the electron-emitting bodies 3*b* in Example 21 was replaced by a $SiO_2$ liquid coating preparation in which $SiO_2$ fine particles of about 100 angstroms in particle diameter were dispersed, to form a similar electron-emitting device. There were obtained substantially the same results as in Example 21.

Example 23

Similar results were obtained also when the organic metal compound solution employed to form the electron-emitting bodies Sb in Example 20 was replaced by a coating preparation in which $SnO_2$ fine particles of about 100 angstroms in particle diameter were dissolved by dispersion together with an organic binder.

Example 24

On a substrate a $SiO_2$ film is vacuum deposited to form an insulating layer 5*a*, on which Pd is vacuum deposited in a thickness of 500 angstroms (electron-emitting layer 3*a*) and further an insulating layer 5*b* is formed by vacuum deposition of a $SiO_2$ film [see FIG. 34 (*a*)].

Next, the insulating layers 5*a*, 5*b* and electron-emitting layer 3*a* are etched to form a stepped portion 18 [see FIG. 34 (*b*)].

Thereafter, Ni is applied by masking vacuum deposition in a thickness of 500 angstroms to form electrodes 1 and 2 [see FIG. 34 (*c*)].

An organic palladium solution is further coated on the surface of the device substrate, followed by baking to provide electron-emitting bodies 3*b* on the sidewall of the stepped portion [see FIG. 34 (*d*)].

The resulting electron-emitting device has the structure that electron-emitting materials are present only in the vicinity of the stepped portion in contrast with Example 20.

Good results were obtained as in Example 20.

Example 25

Example 24 was repeated to obtain an electron-emitting device, except that the Pd fine particles film of the electron-emitting layer 3*a* in Example 24 was replaced by a layer obtained by coating a Pd fine particles dispersed solution as shown in FIG. 35.

There was obtained the same electron emission.

Example 26

The same electron emission as in Example 20 was obtained also in a device in which as illustrated in FIG. 36 a Pd vapor-deposited film serving as an electron-emitting layer 3*a* was disposed in an insulating layer 5 containing electron-emitting materials 9 as Pd fine particles, a stepped portion was formed, and electron-emitting bodies 3*b* were further provided on the sidewall of the stepped portion by coating an organic palladium solution followed by baking.

Example 27

Figure 37A:
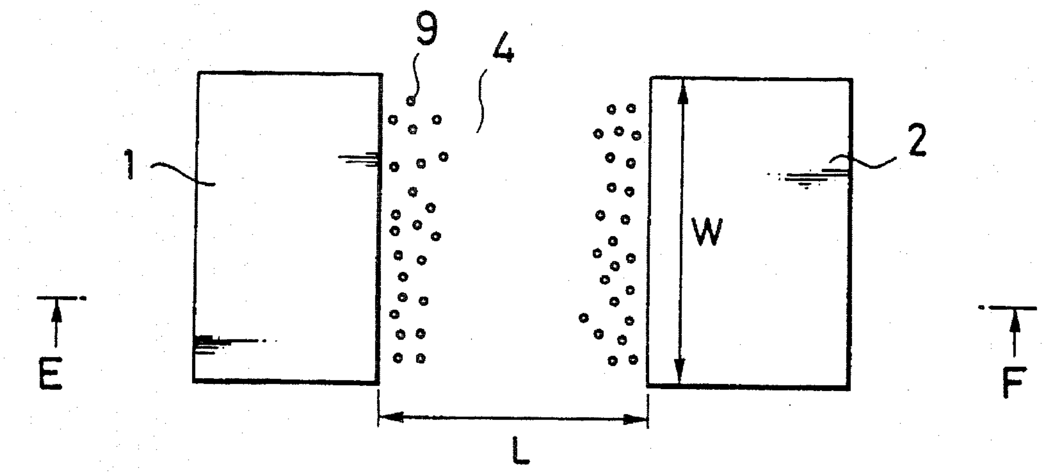
FIG. 37(*a*) and 37(*b*) diagrammatically illustrates an electron-emitting device comprising two kinds of fine particles arranged in a dispersed stage.
Figure 37B:
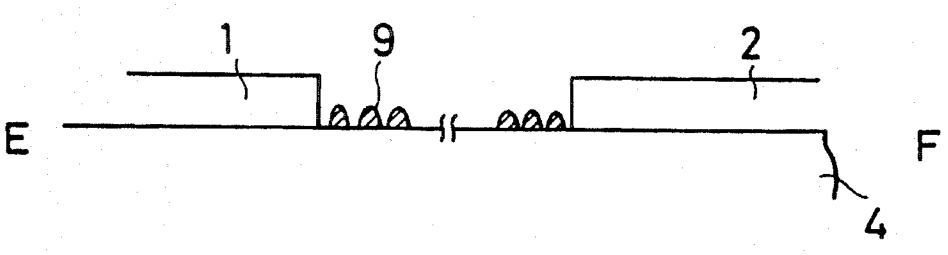
Figure 38:
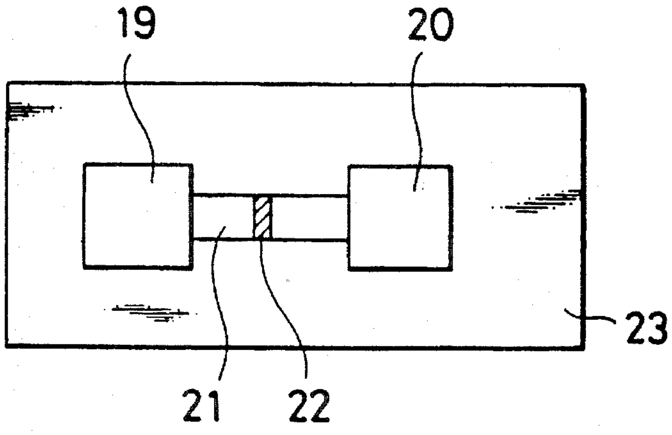
FIG. 38 is a view illustrating a conventional electron-emitting device.

In the constitution illustrated in FIG. 37, on a glass substrate 4, titanium electrodes 1 and 2 were formed with a thickness of 1,000 angstroms, L=0.8 μm and W=300 μm, and thereafter $SnO_2$ and Pd were arranged as fine particles in a dispersed state between the electrodes.

As a method therefor, a $SnO_2$ dispersion ($SnO_2$: 1 g; solvent: MEK (methyl ethyl ketone)/cyclohexanone=3/1, 1,000 cc: butyral: 1 g) having a primary particle diameter of 80 to 200 angstroms was spin-coated, followed by heating. A Pd dispersion having a primary particle diameter of about 100 angstroms was further spin coated, followed by heating to obtain an electron-emitting device.

A voltage of about $10^{-5}$ Tort was applied between the electrodes of the device thus formed. As a result, there was obtained an electron emission current of 1.1 μA under an applied voltage of 15 V.

Thus, substantially the same electron emission is obtained even under the applied voltage of lower by approximately 5 volts than that of the device containing no Pd fine particles and solely comprised of $SnO_2$. In this manner, the drive voltage was able to be lowered by the device containing different kind of fine particles.

Example 28

In regard to the $SnO_2$ dispersion of Example 27, a dispersion of $SnO_2$ of 80 to 200 angstroms in particle diameter and a dispersion of $SnO_2$ of about 3,000 angstroms in particle diameter were prepared, and two kinds of the $SnO_2$ dispersions were coated in the same manner as in Example 27 but in one step for each dispersion, thus arranging fine particles in a dispersed state to obtain a electron-emitting device.

As electron emission characteristics of the device thus formed, there was obtained an electron emission current of about 1.1 uA under an applied voltage of 17 V.

Thus, substantially the same electron emission is obtained even under the applied voltage of as about 3 V lower than that of the device obtained by coating in two steps the dispersions of $SnO_2$ of 80 to 200 angstroms in particle diameter. In this manner, the drive voltage was able to be lowered by adding the particles having a larger particle diameter.

Effect of the Invention

As described above, according to the electron-emitting device of the present invention and the method for preparing the same, electron-emitting devices that can have stable structure even if the electrode spacing having the electron-emitting materials is made very narrow can be formed without applying the forming required in the prior art.

Accordingly, the electron-emitting devices prepared by the present invention are quite free from the difficulties conventionally accompanying the forming treatment, so that it becomes possible to manufacture the devices having less irregularities in characteristics, in a large number and with ease, bringing about great industrial utility.

The electron-emitting device obtained by the present invention can also be utilized in planar display devices in which the electron-emitting devices are mounted in a single plane and electrons emitted by applying a voltage are accelerated to stimulate phosphors to effect light-emission.

An electron-emitting device that is stabler and of longer life and also has a good efficiency can also be obtained by bringing the electrode constitution into a multi-layer constitution.

Also, the electron-emitting device in which the fine particles are fixed in the insulating layer is free of any movement of the fine particles during drive, and thus can be an electron-emitting device that is stable and of elongated life.

The electron emission efficiency can be improved by suitably adjusting the density of the fine particles.

The electron-emitting device having the semiconductor layer as illustrated in FIG. 17 makes it possible to lower the drive voltage by controlling the electrical resistance of the semiconductor, and also can be effective in improvement of emitted currents.

We claim:

1. An electron-emitting device comprising a device structure that includes a semiconductor layer formed between opposing electrodes on a planar substrate, said semiconductor layer having fine particles dispersed inside said semiconductor layer, or on said semiconductor layer, said fine particles ranging in particle diameter from the order of tens of angstroms to the order of microns.

2. The electron-emitting device of claim 1, having the structure that said fine particles are completely included into said semiconductor layer.

3. The electron-emitting device of claim 1, having the structure that said fine particles are partly contained in said semiconductor layer and partly exposed therefrom.

4. The electron-emitting device of claim 1, wherein said fine particles are made of a substance selected from the group consisting of borides, carbides, nitrides, metals, metal oxides, semiconductors, and carbon.

5. The electron-emitting device of claim 1, wherein said fine particles are dispersed between said electrodes by coating.

6. The electron-emitting device of claim 1, wherein said fine particles are dispersed between said electrodes by vacuum deposition.

7. The electron-emitting device of claim 1, wherein said fine particles are dispersed by thermal decomposition of an organic metal compound.

8. The electron-emitting device of claim 1, having structure in which said fine particles are fixed in the state of their protruding from said semiconductor layer.

9. The electron-emitting device of claim 1, wherein said fine particles are comprised of palladium element.

10. The electron-emitting device of claim 1, wherein said semiconductor layer has an electrical specific resistance of at least $1\times10^{-3}$ ohm-cm.

11. The electron-emitting device of claim 1, wherein said semiconductor layer is comprised of carbon.

12. An electron-emitting device comprising:

a planar substrate;

opposing electrodes on said planar substrate;

a semiconductor material located between said electrodes;

fine particles having a particle diameter ranging from the range of tens of angstroms to the order of microns, said fine particles being between said electrodes and wherein electrons are emitted by applying a voltage between said electrodes.

13. The electron-emitting device of claim 12, wherein said fine particles are disposed by thermal decomposition of an organic metal compound.

14. The electron-emitting device of claim 12, wherein said fine particles are comprised of palladium.

15. The electron-emitting device of claim 12, wherein said semiconductor material has an electrical specific resistance of at least $1\times10^{-3}$ ohm.cm or more.

16. The electron-emitting device of claim 12, wherein said opposing electrodes and said fine particles are located on said planar substrate, where semiconductor material exists between said opposing electrodes and said fine particles.

17. The electron-emitting device of claim 12, wherein said fine particles are comprised of palladium.

18. The electron-emitting device of claim 12, wherein said semiconductor material is comprised of carbon.

19. An electron-emitting device comprising:

a planar substrate;

opposing electrodes on said planar substrate;

fine particles between a pair of electrodes coated with a semiconductor material;

wherein electrons are emitted by applying a voltage between said electrodes; and wherein said fine particles have a particle diameter ranging from the range of tens of angstroms to the order of microns.

20. The electron-emitting device of claim 19, wherein said fine particles are comprised of palladium.

21. The electron-emitting device of claim 19, wherein said semiconductor material has an electrical specific resistance of at least $1\times10^{-3}$ ohm.cm.

22. The electron-emitting device of claim 19, wherein said semiconductor material is comprised of carbon.

* * * * *